United States Patent
Brown et al.

(10) Patent No.: US 10,875,649 B2
(45) Date of Patent: Dec. 29, 2020

(54) MODULAR AIRCRAFT GALLEY SYSTEMS, APPARATUS AND METHODS FOR CONFIGURATION

(71) Applicant: B/E Aerospace, Inc., Winston-Salem, NC (US)

(72) Inventors: Anthony Brown, Leighton Buzzard (GB); Donna C. Brownlie, Northamptonshire (GB); Neil Elshaw, Gosport (GB); Sam Foster, Milton Keynes (GB); Peter Griffiths, Kensworth (GB); Shahmaan Khan, London (GB); Richard Morris, Pulloxhill (GB); Venkata Prasanth Suman Neti, Milton Keynes (GB); Chris Nixon, Bedfordshire (GB); Elizabeth M. Payne, Rowesham (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 450 days.

(21) Appl. No.: 15/648,359

(22) Filed: Jul. 12, 2017

(65) Prior Publication Data

US 2018/0016014 A1 Jan. 18, 2018

Related U.S. Application Data

(60) Provisional application No. 62/361,460, filed on Jul. 12, 2016.

(51) Int. Cl.
*B64D 11/04* (2006.01)
*B64D 9/00* (2006.01)
(Continued)

(52) U.S. Cl.
CPC ............. *B64D 9/003* (2013.01); *B21D 53/92* (2013.01); *B64F 5/00* (2013.01); *F16B 5/0088* (2013.01); *F16B 5/0225* (2013.01); *Y10T 403/75* (2015.01)

(58) Field of Classification Search
CPC .... B21D 47/00; B21D 53/92; B60H 1/00014; B64D 11/00; B64D 11/0007;
(Continued)

(56) References Cited

U.S. PATENT DOCUMENTS 2,974,499 A * 3/1961 Sinatra ...................... F25D 3/12
62/386
5,040,857 A * 8/1991 Mandel ................... E05D 3/022
16/364

(Continued)

*Primary Examiner* — Medhat Badawi
(74) *Attorney, Agent, or Firm* — Suiter Swantz pc llo

(57) ABSTRACT

In a preferred embodiment, a modular galley monument for an aircraft cabin includes a first side panel, a second side panel, and an upper surface connecting the first side panel and the second side panel. The modular galley monument may include dividers partitioning the monument into a number of compartments. The monument may include an upper monument portion and a lower monument portion connected at a periphery via a seal allowing for vertical deflection between the first monument portion and the second monument portion of at least one inch while maintaining contact with both. The monument may include an integrated heating appliance for a compartment, including an insulation shell, a heated compartment positioned within the insulation shell, an electrical heating unit disposed within the insulation shell and configured to provide heat energy to the heated compartment. And a door assembly rotatably connected about an opening of the heated compartment.

7 Claims, 29 Drawing Sheets

(51) Int. Cl.
*F16B 5/02* (2006.01)
*F16B 5/00* (2006.01)
*B21D 53/92* (2006.01)
*B64F 5/00* (2017.01)

(58) Field of Classification Search
CPC ....... B64D 11/003; B64D 11/02; B64D 11/04; B64D 13/06; B64D 13/08; B64D 2011/0046; B64D 2011/0076; B64D 2013/0629; B64D 9/003; B64F 5/00; E05B 65/06; E05F 5/06; F24C 15/2035; F24C 15/30; F24C 15/34; F25B 2500/12; F25D 11/003; F25D 15/00; F25D 17/045; F25D 17/06; F25D 2317/063; F25D 23/10; F25D 2500/00; Y10S 292/15; Y10T 292/1043; Y10T 292/106; Y10T 292/1075; Y10T 292/1083
See application file for complete search history.

(56) References Cited

U.S. PATENT DOCUMENTS

| | | | | | |
|---|---|---|---|---|---|
| 5,320,804 | A * | 6/1994 | Zakaria | | A23L 3/01 219/686 |
| 5,322,244 | A * | 6/1994 | Dallmann | | B64D 11/04 244/118.1 |
| 5,395,075 | A * | 3/1995 | Sprenger | | B64D 11/00 182/77 |
| 5,397,143 | A * | 3/1995 | Bird | | B60R 3/02 280/166 |
| 5,474,260 | A * | 12/1995 | Schwertfeger | | B64D 11/00 244/118.5 |
| 5,784,836 | A * | 7/1998 | Ehrick | | B64D 11/00 244/118.5 |
| 5,832,670 | A * | 11/1998 | Bennett | | E05D 7/02 49/382 |
| 6,073,883 | A * | 6/2000 | Ohlmann | | B64D 11/00 105/316 |
| 6,182,926 | B1 * | 2/2001 | Moore | | B64D 11/00 244/118.5 |
| 6,616,098 | B2 * | 9/2003 | Mills | | B64D 11/00 244/118.1 |
| 6,659,225 | B2 * | 12/2003 | Olliges | | B64D 11/00 182/97 |
| 6,668,650 | B1 * | 12/2003 | Lafleur | | G01M 7/00 73/571 |
| 6,739,100 | B1 * | 5/2004 | Lewandowski | | E04F 11/02 52/184 |
| D617,582 | S * | 6/2010 | Zalewski | | D6/708 |
| 8,136,763 | B2 * | 3/2012 | Saint-Jalmes | | B64C 1/1469 244/118.5 |
| 8,519,824 | B1 * | 8/2013 | Rankin | | B64D 11/00 244/118.5 |
| 8,794,569 | B1 * | 8/2014 | Ohlmann | | B64D 11/00 244/118.6 |
| 10,214,276 | B2 * | 2/2019 | Hussain | | B64C 1/1476 |
| 2001/0050519 | A1 * | 12/2001 | Kasuya | | B64D 11/04 312/315 |
| 2003/0019976 | A1 * | 1/2003 | Cheung | | B64D 11/00 244/118.5 |
| 2005/0121978 | A1 * | 6/2005 | McAvoy | | H02J 3/14 307/43 |
| 2006/0060181 | A1 * | 3/2006 | Sasaki | | B64D 11/04 126/21 A |
| 2006/0145002 | A1 * | 7/2006 | Van Loon | | A47B 51/00 244/118.1 |
| 2006/0186268 | A1 * | 8/2006 | Harrington | | B64D 11/0007 244/118.5 |
| 2007/0228216 | A1 * | 10/2007 | Wenstrom | | B64D 11/04 244/118.5 |
| 2008/0001031 | A1 * | 1/2008 | Doebertin | | B64D 11/04 244/118.1 |
| 2009/0261200 | A1 * | 10/2009 | Saint-Jalmes | | B64D 11/04 244/118.5 |
| 2009/0314889 | A1 * | 12/2009 | Baatz | | B64D 11/0007 244/118.5 |
| 2010/0140398 | A1 * | 6/2010 | Cunningham | | A47J 31/005 244/118.5 |
| 2010/0155391 | A1 * | 6/2010 | Koschberg | | B64D 11/04 219/672 |
| 2010/0181425 | A1 * | 7/2010 | Guering | | B64D 11/00 244/118.5 |
| 2010/0195317 | A1 * | 8/2010 | Oketani | | A47F 3/001 362/125 |
| 2010/0219292 | A1 * | 9/2010 | Saint-Jalmes | | B64D 11/0023 244/118.5 |
| 2011/0090064 | A1 * | 4/2011 | Dahms | | B64D 11/04 340/10.42 |
| 2011/0101160 | A1 * | 5/2011 | Gomes | | B64C 1/1423 244/118.5 |
| 2011/0148664 | A1 * | 6/2011 | Shiomori | | B64D 11/0015 340/945 |
| 2011/0210203 | A1 * | 9/2011 | Chua | | B61D 37/006 244/118.5 |
| 2011/0215199 | A1 * | 9/2011 | Lee | | B61D 37/00 244/118.5 |
| 2011/0278324 | A1 * | 11/2011 | Kilian | | B67D 7/04 222/135 |
| 2013/0187000 | A1 * | 7/2013 | Godecker | | B64D 11/04 244/118.5 |
| 2013/0206903 | A1 * | 8/2013 | Savian | | B64D 11/0015 244/118.1 |
| 2013/0248649 | A1 * | 9/2013 | Burd | | B64D 11/04 244/1 N |
| 2013/0248652 | A1 * | 9/2013 | Godecker | | B64D 11/04 244/118.5 |
| 2013/0256249 | A1 * | 10/2013 | Burd | | B64D 11/04 211/153 |
| 2013/0259562 | A1 * | 10/2013 | Burd | | B64D 11/04 403/187 |
| 2014/0048650 | A1 * | 2/2014 | Schliwa | | B64D 11/00 244/118.5 |
| 2014/0209741 | A1 * | 7/2014 | Boenning | | B64D 11/06 244/118.6 |
| 2014/0212241 | A1 * | 7/2014 | Burd | | F16B 5/01 411/366.1 |
| 2014/0238064 | A1 * | 8/2014 | Hawkins | | F25D 23/02 62/244 |
| 2014/0263835 | A1 * | 9/2014 | Godecker | | B64D 11/04 244/118.5 |
| 2014/0339363 | A1 * | 11/2014 | Moje | | B64D 11/00 244/118.5 |
| 2014/0353425 | A1 * | 12/2014 | Boren, Jr. | | B64D 11/02 244/118.5 |
| 2014/0355282 | A1 * | 12/2014 | Cuddy | | B64C 1/1407 362/471 |
| 2014/0367516 | A1 * | 12/2014 | Lange | | B65D 88/14 244/118.1 |
| 2014/0367517 | A1 * | 12/2014 | Eckel | | B64D 47/02 244/118.5 |
| 2015/0028670 | A1 * | 1/2015 | Boodaghians | | B64D 11/04 307/9.1 |
| 2015/0076981 | A1 * | 3/2015 | Hacker | | A47B 96/025 312/309 |
| 2015/0298793 | A1 * | 10/2015 | Fox | | B64C 3/56 244/49 |
| 2015/0314872 | A1 * | 11/2015 | Holtorf | | B64D 11/0007 244/118.5 |
| 2015/0367931 | A1 * | 12/2015 | Cullen | | B64D 9/003 244/118.1 |
| 2016/0096624 | A1 * | 4/2016 | McIntosh | | E03C 1/18 4/621 |
| 2017/0021929 | A1 * | 1/2017 | McKee | | B64D 11/02 |
| 2017/0057637 | A1 * | 3/2017 | Cole | | B64D 11/00 |
| 2017/0156499 | A1 * | 6/2017 | Kane | | A47B 96/20 |
| 2017/0304759 | A1 * | 10/2017 | Foenss | | B01D 46/10 |

(56) References Cited

U.S. PATENT DOCUMENTS

2018/0016014 A1\* 1/2018 Burd .................. E05B 65/06
2018/0072425 A1\* 3/2018 Weifenbach ....... B64D 11/0007
2018/0105253 A1\* 4/2018 Singleton ................ B64C 1/24

\* cited by examiner

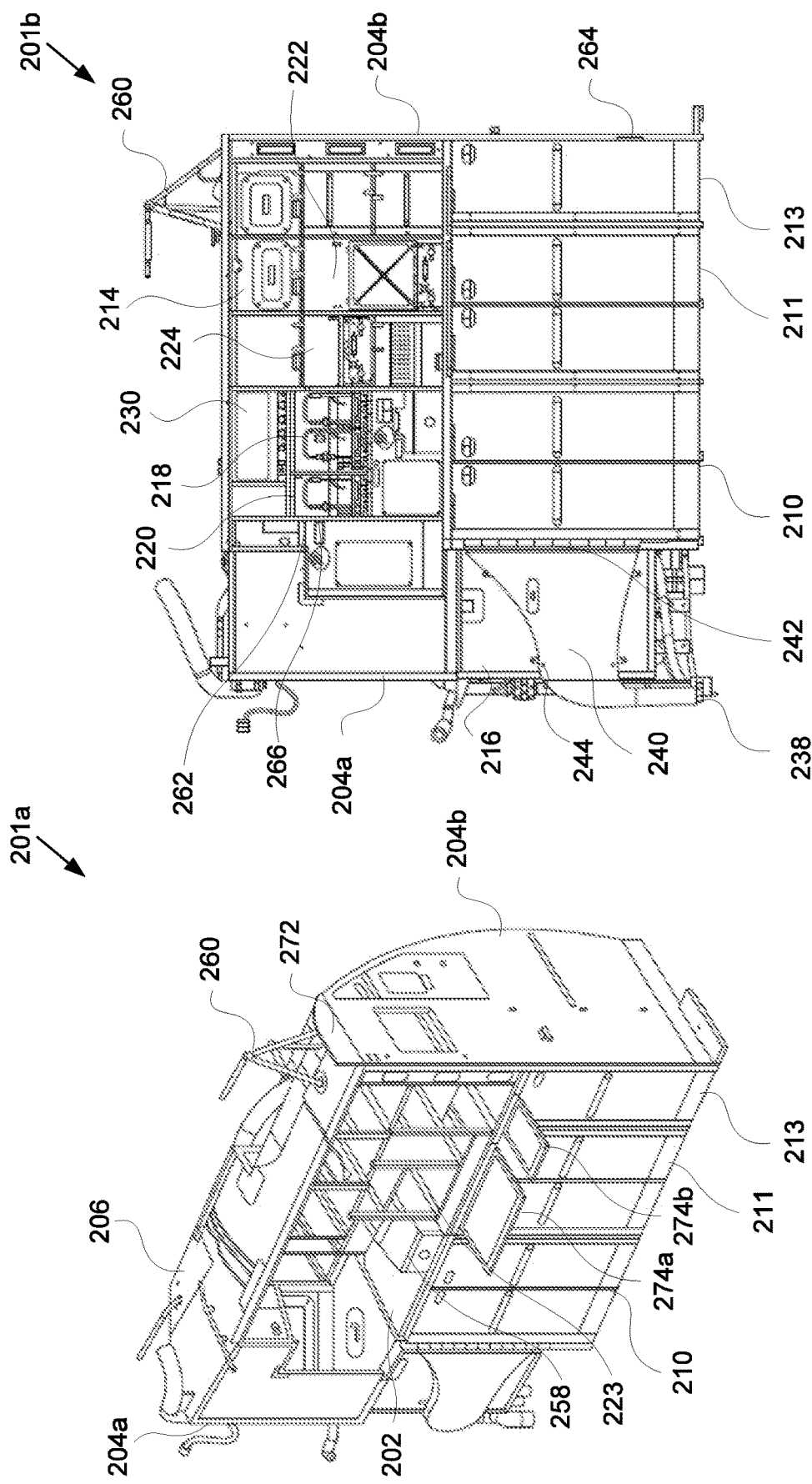

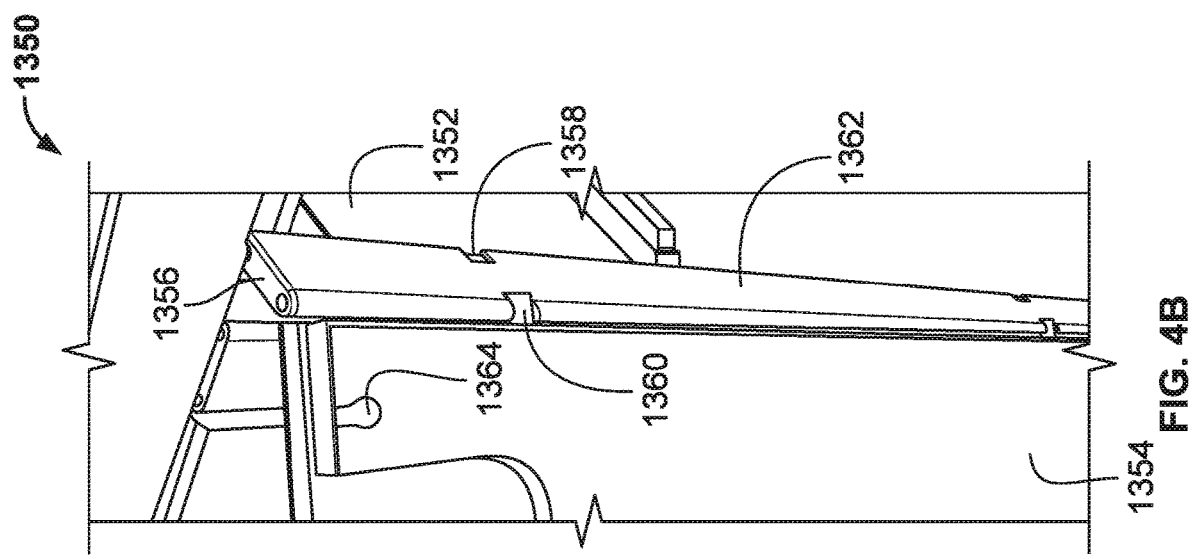
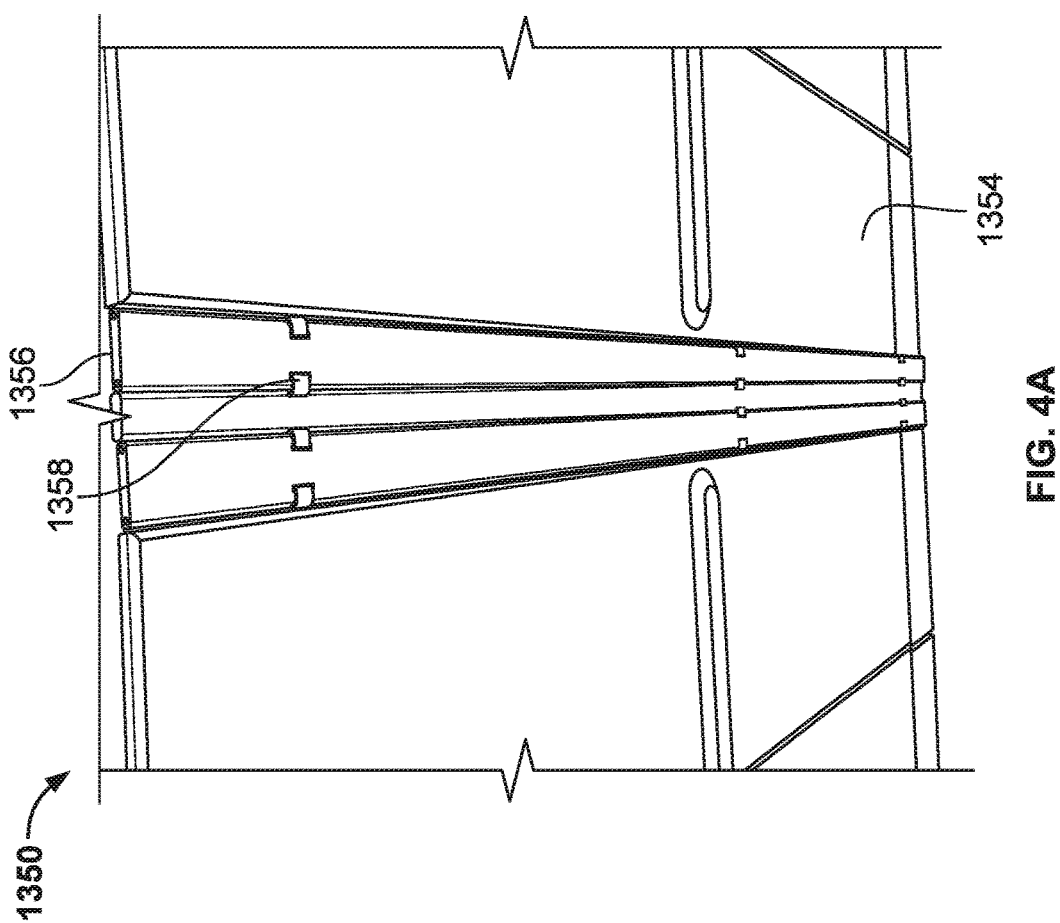

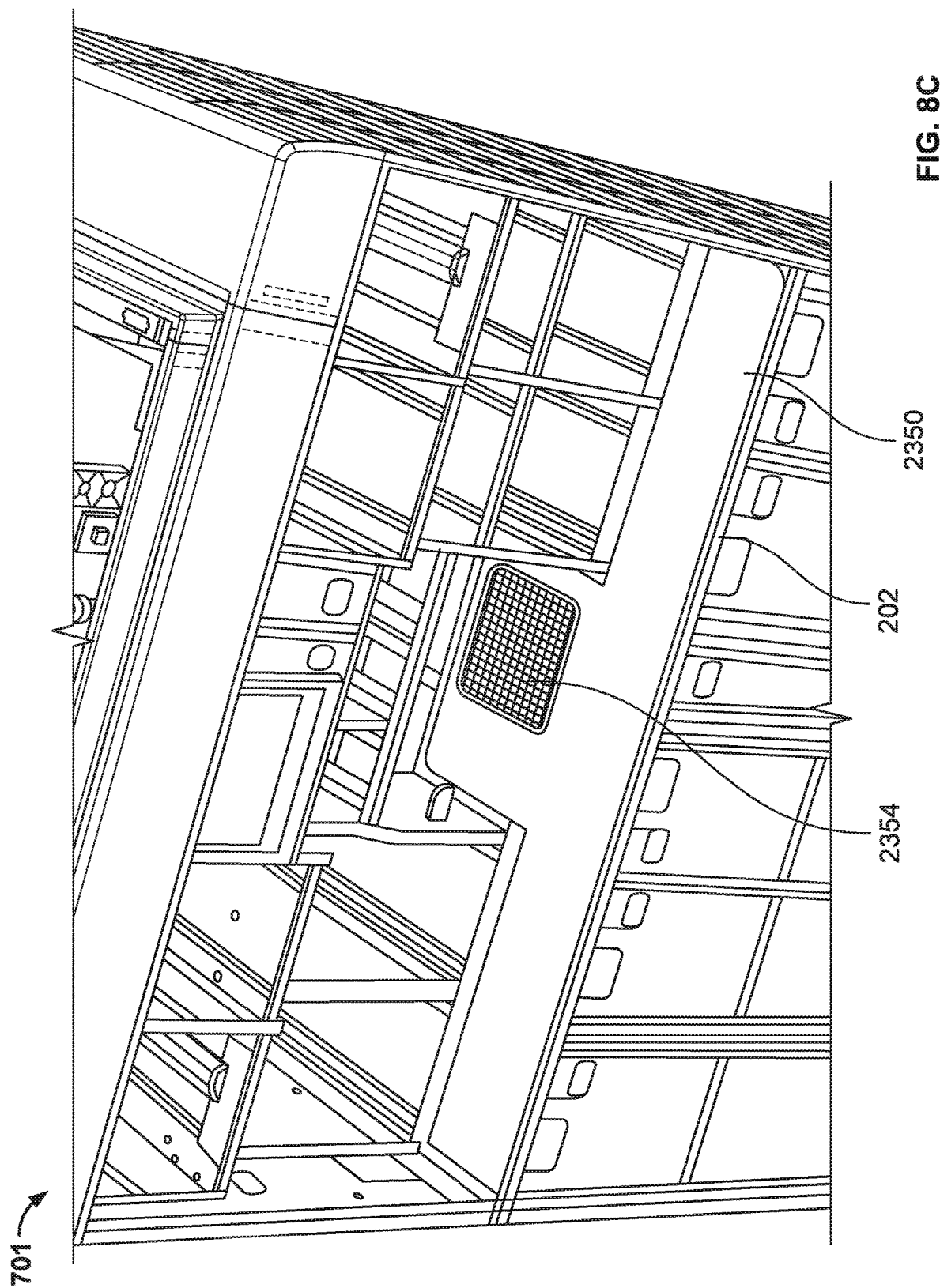

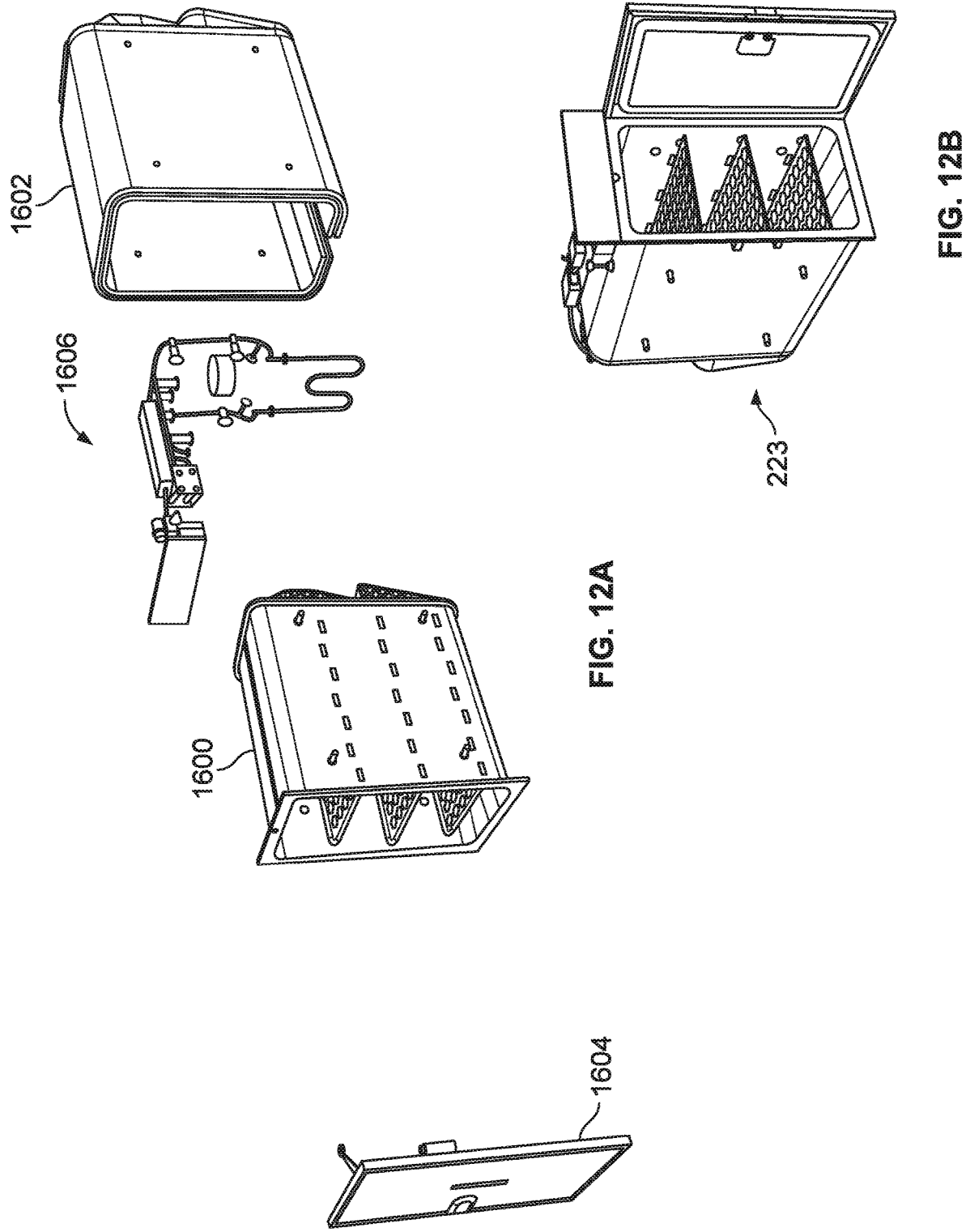

MODULAR AIRCRAFT GALLEY SYSTEMS, APPARATUS AND METHODS FOR CONFIGURATION

CROSS-REFERENCE TO RELATED APPLICATION

This application claims priority from U.S. Provisional Application No. 62/361,460, filed Jul. 12, 2016, the contents of which are incorporated by reference in their entirety.

BACKGROUND

The present disclosure relates to aircraft galley systems for commercial aircraft. In-flight catering services typically incorporate self-contained refrigeration units that are cooled to prevent spoilage of food prior to distribution to passengers, and to keep beverages at desired serving temperatures, as well as separate ovens for heating food in the preparation of hot meals to be served aboard aircraft. Currently space must be allocated for each of the heating and cooling devices separately, either in the same galley or in different galleys.

SUMMARY OF ILLUSTRATIVE EMBODIMENTS

In one aspect, the present disclosure relates to a modular galley monument of an aircraft including a lower monument portion including a first side panel, a second side panel, and a work surface connecting the first side panel and the second side panel; an upper monument portion connected to the lower monument portion; a number of dividers partitioning the galley monument into a plurality of compartments; and a service system configured to provide service the plurality of compartments. In an example embodiment, the service system is a plumbing system including at least one of a sump, a drip tray assembly, and a double cavity drip tray. In an example embodiment, the service system is an air conditioning system for servicing one or more chilled compartments.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where:

FIGS. 2A-2B illustrate a modular galley monument according to a second exemplary embodiment;

FIGS. 4A-4B represent perspective views of a door assembly in a first position and a second position, respectively, according to an example embodiment;

FIGS. 8A-8C represent various views of a work deck mounted on a work surface, according to an example embodiment;

FIGS. 12A-12B represent various views of an oven, according to an example embodiment;

DETAILED DESCRIPTION OF ILLUSTRATIVE EMBODIMENTS

Figure 1A:
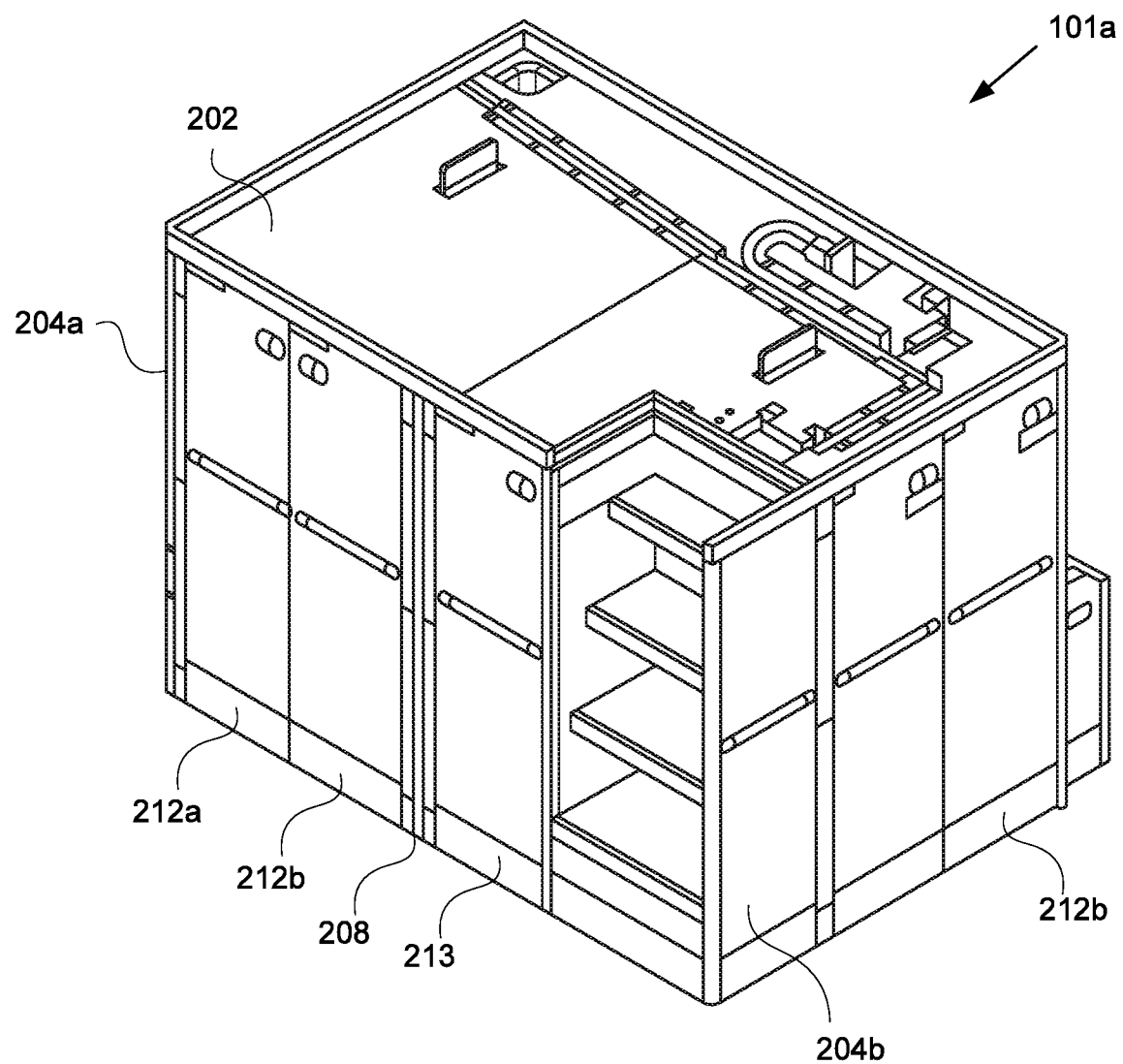
FIG. 1A is a perspective view of a modular galley monument of an aircraft, according to an example embodiment.
Figure 1B:
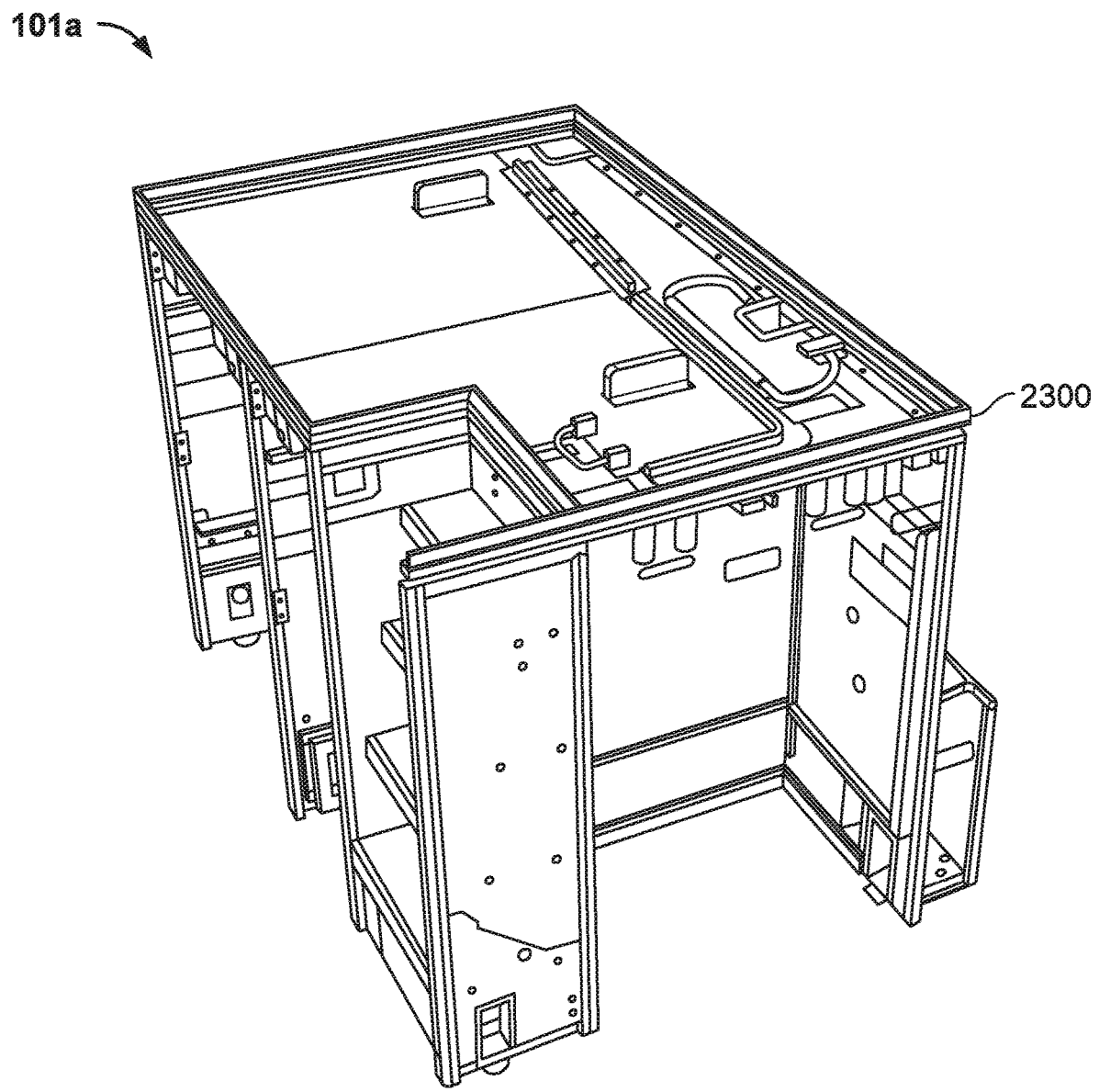
FIGS. 1B-1F represent various views of a seal, according to example embodiments.
Figure 1C:
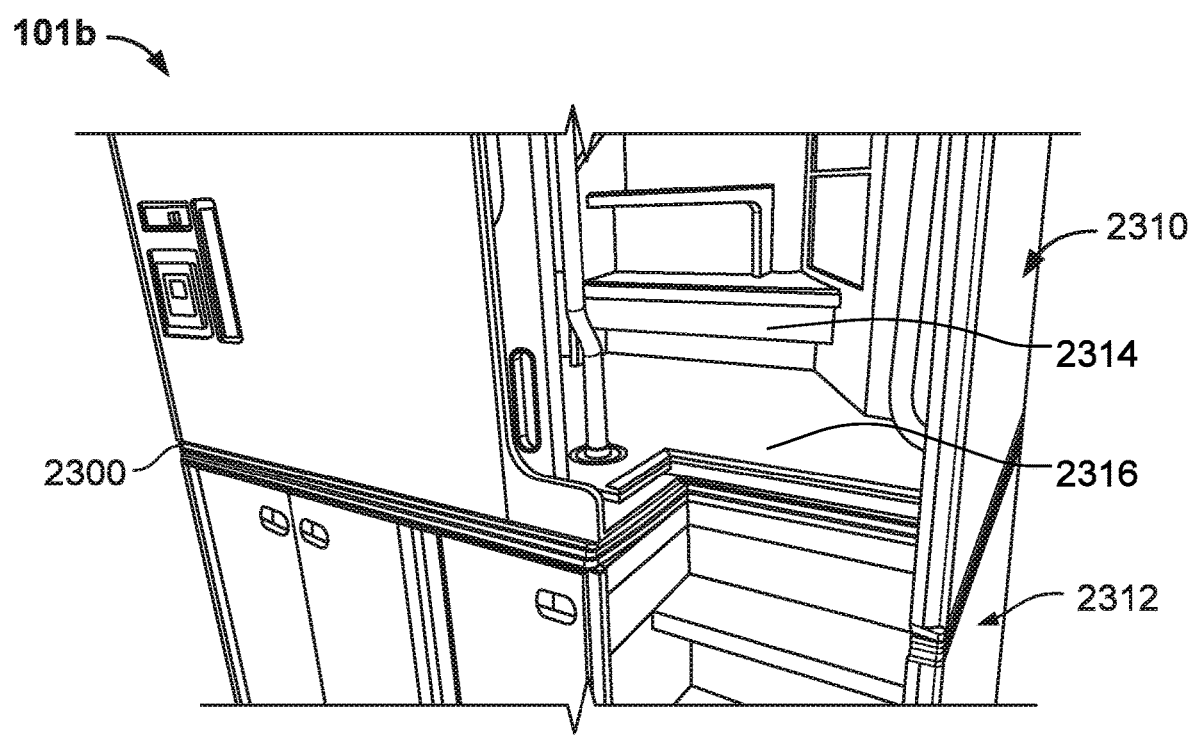

FIGS. 1A-1C represent various views of a modular galley monument 101a-b connected to a section of floor 103 on an aircraft, according to an example embodiment. FIGS. 2A-2B represent various views of a modular galley monument 201a-b connected to a section of floor 103 on an aircraft, according to an example embodiment. The galley monuments 101a-b and 201a-b may each positioned with a longitudinal axis perpendicular to a longitudinal axis of the aircraft, and with a longitudinal axis parallel to the longitudinal axis of the aircraft. Each of the exemplary galley monuments 101a-b, 201a-b may include a work surface 202, a first side panel 204a, a second side panel 204b, and a number of dividers 208.

The dividers 208 may include multiple sizes, with some dividers 208 positioned horizontally and some dividers 208 positioned vertically within the galley monument 101a-b, 201, partitioning the galley monument 101a-b, 201a-b into compartments 215 for storage of food, beverages, equipment, and other items needed for servicing passengers and flight operations, as well as into bays for the storage and securement of trolleys. In an example, a divider can be an interior monument wall.

In one example, the galley monument 201a-b includes at least one of a trolley 210, 212 and a chilled trolley 211, 213. As illustrated, the galley monument 201a-b includes dual chilled trolleys 211, 213. In an example, the side panel 204a and the side panel 204b are connected by the work surface 202 (FIG. 1A). In an example, the side panel 204a and the side panel 204b are further connected by a top panel 206 (FIG. 2A).

The galley monument 101a-b may be used to support additional monuments above, for example, to support an upper monument 2310 illustrated in FIG. 1C. In some implementations, the upper monument 2310 can be a crew member room as shown in FIG. 1C. The crew member room can include a bed 2314, a galley floor 2312, as well as other room amenities.

Figure 1D:
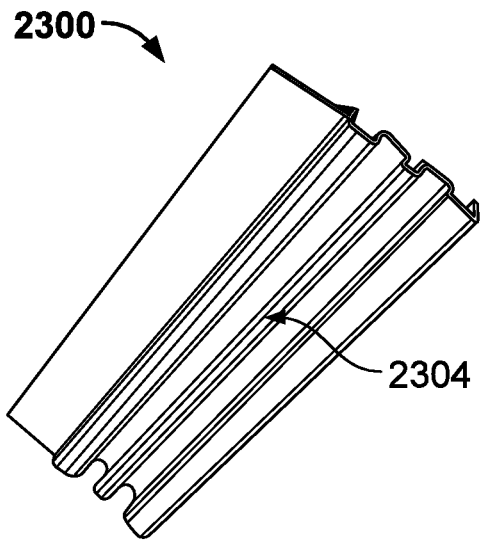
Figure 1E:
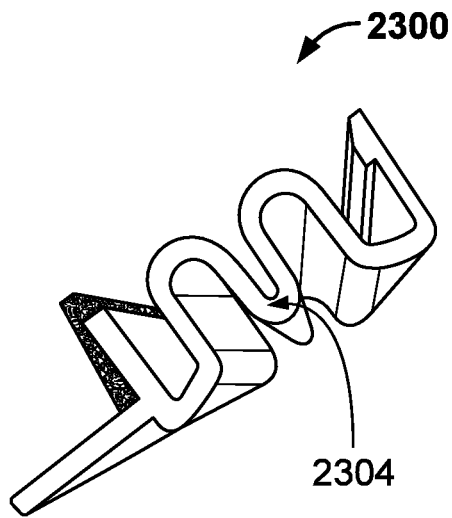
Figure 1F:
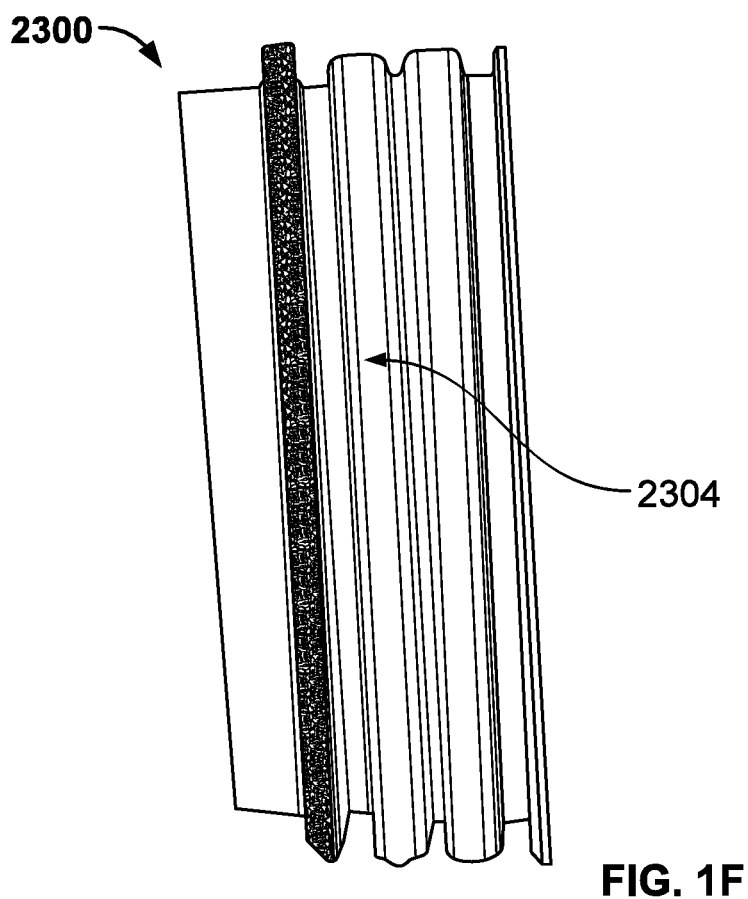

In some implementations, monuments may include two or more sections connected in a vertical or horizontal arrangement such as a top and a bottom section or a left and a right section arrangement, respectively. In a case of a vertically combined monument, as illustrated by FIGS. 1D-1F, a seal 2300 positioned below a top section and above a bottom section to separate the two sections or portions of the two sections may be desirable. The seal 2300 may allow the two sections to be securely connected yet flexible enough to compensate for flexing or movement of the top and the bottom sections during flight operations with little risk of fracture, damage, or failure when the monument may be subject to forces such as when the aircraft takes off and lands, or when the aircraft experiences turbulence. In some implementations, an upper galley monument is supported independently from a lower galley monument. In this case, the lower monument is attached to the floor only, the upper monument to the ceiling, and the seal 2300 is configured to bridge a gap between them. In an example, relative movement between the monuments can be as much as 2".

Further, the seal 2300 may keep compartments and contents of sections of the monument separate for operational or sanitation purposes. In the circumstance where two or more monuments manufactured by different providers are stacked or otherwise interfaced, the seal 2300 may be used to transition between the adjacent monuments and to mask any discontinuity between the adjacent monuments.

The seal 2300 may include a number of ribs 2304 along a length of the seal 2300. The seal 2300 may be positioned between an upper edge of a lower galley monument 2312 (such as the galley monument 101*b*) and a lower edge of an upper galley monument 2310 such that the lower galley monument 2312 and the upper galley monument 2310 are not in direct contact. In an example, the seal 2300 can be mechanically fastened to the respective monuments using a trim section to trap the top and bottom sections of the seal. In an example, the trim section can be a complementing lip or channel extrusion that is secured to the respective monuments. In an example, an alternative arrangement would be via a self gripping fastening tape such as Velcro™ or grip lock.

The seal 2300 may allow for vertical deflection between the upper galley monument 2310 and the lower galley monument 2312 while maintaining contact with both. The seal 2300 may be formed of an aerospace certified silicone and designed to allow large vertical deflections between the lower galley monument 2312 and the upper galley monument 2310. For example, the vertical movement between the upper galley monument 2310 and the lower galley monument 2312 may range up to two inches while each remains in contact with the seal 2300. The seal 2300 and the ribs 2304 may be accessible for cleaning such that the seal 2300 meets FDA requirements. An example, of an FDA requirement is that exposed surfaces of the seal 2300 must be cleanable by hand without special tools; only a rag and spray bottle may be used.

Additional equipment may be needed in galley implementations that include handling of utilities such as liquids, air flow, or power additional equipment. Space may be needed internally or externally for each such monument to accommodate pathways for movement of liquids, viscous substances, and air. Such equipment may include various collection devices such as work surfaces, drip trays, and drip pans that can collect and contain liquids and viscous substances without damage or having material properties otherwise affected. Further, equipment for routing and disposal of liquids and viscous substances from the monuments also complement collection devices. These can include various valves, drain tubes, drain lines, and drain plugs or other assemblies or combinations of such components.

Air handling devices may also include various hoses, ducts, channels, vents, plenums, nozzles and diffusers such as for changing a volume, direction, pressure, and/or speed of air flow into, out of, or through a monument. In addition, air handling devices such as air conditioners may also require equipment for handling liquid such as condensate and refrigerant for at least part of a heating and cooling cycle.

In some implementations, a monument may have a compartment for equipment used to warm or cool food, beverages, or other items. Such compartments may be connected to air handling devices, an electrical power source, and/or utilities such as liquids. For instance, liquid and electrical power may be supplied to an oven or other device to steam heat contents of an oven. Other compartment equipment may be used to cool food, beverages, or other items. Such compartments may also be connected to the same or similar air handling and electrical devices, and the same fluid handling devices in ways to allow cooling of contents, such as refrigeration and to store provided ice, as well as produce ice in some implementations.

The galley monuments may be secured to the aircraft by a variety of securement systems 130, further described by related U.S. patent application Ser. No. 15/648,165 entitled "Aircraft Monument Floor Mounting System" and filed Jul. 12, 2017, hereby incorporated by reference in its entirety, at various attachment points on a floor 103 of an aircraft. In some examples, the galley monuments are further secured to the aircraft by at least one upper galley attachment 260 further described by related U.S. patent application Ser. No. 15/648,200 entitled "Upper Mounting Apparatus for Retaining Aircraft Monuments" and filed Jul. 12, 2017, hereby incorporated by reference in its entirety. Each upper galley attachment 260 may be connected to an attachment point, in some embodiments, to form a triangulated joint with the galley monument that supplements connections between the lower attachment points and the lower mounting positions of the galley monument secured by one of the securement systems 130. In some examples, the upper galley attachment 260 may be connected to at least two points on the galley monument and at least one point on the aircraft in a triangulated manner. In other examples, the upper galley attachment 260 may be connected to at least one point on the galley monument and at least two points on the aircraft in a triangulated manner.

In some implementations, a modular galley monument can include at least one of a distributed galley system including an electrical system, an air handling system, and a plumbing system which may each be connected to one or more portions of the galley monument and another portion of the aircraft. The electrical system of certain example galleys, as illustrated generally in FIGS. 2B, 11A-11B may include at least one of a control panel 230, 1250 in communication with a crew attendant seat (CAS) electrical provision, a flight attendant panel (FAP), an electrical access panel, and other electrical interfaces (not shown). Electricity may be supplied by the electrical system by the aircraft. The air handling system may include an air intake 238 connected to an aircraft supply port (FIG. 2B), an air duct 240 (FIG. 2A), an air outlet manifold 242 (FIG. 4A), and a mount 244 (FIG. 4A). Conditioned air may be supplied to/from the air handling system by the aircraft. In an example, air handling system may include an ACU chiller which is powered by the control panel 1250. The plumbing system may include a potable water supply, a potable water shut-off valve actuator, a drainage, a waste water, and a drain valve release, and liquids may flow between the plumbing system and different portions of the galley monument and the aircraft.

In some embodiments, standard containers 214 are positioned within compartments 215 located above the work surface 202 and configured to interface with at least one of the distributed galley systems. In some implementations, the standard compartments can include a beverage maker 218, a water heater 220, a refrigerator 222, an oven 223, and a microwave 224. The beverage maker 218 of various galley embodiments and the water heater 220 may each be connected to the electrical system and the plumbing system to heat and prepare beverages, the electrical system providing electricity for heating beverages and the plumbing system supplying liquid. The beverage maker 218 may be, in some examples, an espresso maker, coffee maker, pod-style individual hot beverage maker, or carbonated beverage dispenser. The beverage maker 218, the water heater 220, the refrigerator 222, and the microwave 224 may each be connected to the electrical system by an electrical interface with the control panel 1250. The refrigerator 222 may include a freezer.

In some embodiments, a galley monument includes a galley waste disposal unit (GWDU) 258 (see FIG. 2A) connected to the galley monument. A work light 262, an emergency path light 264, a paper clip 266, a vanity mirror, a grab handle 270, a pelmet 272, and a pullout table 274*a* and a pullout table 274*b* may also be connected to the galley monument. The work light 262 and the emergency path light 264 can each be connected to, and draw electricity from, the electrical system.

The pullout table 274*a* and the pullout table 274*b* may be of different sizes, may be stowed underneath the work surface 202 when not in use, and may slide, fold, or otherwise articulate between a stowed position and an extended position. Each galley monument may also include a waste compartment 216 (see FIGS. 2B, 7A-D) positioned underneath the work surface 202.

In some embodiments, the galley monument includes a removable full size trolley 210, a full size chilled trolley 211, a half size trolley 212, and/or a half size chilled trolley 213 positioned beneath the work surface 202. In embodiments including a chilled trolley 211, 213, the chilled trolley compartment may be connected to the air handling system, which provides conditioned air to allow control of an interior temperature of the chilled trolley 211, 213.

The refrigerator 222 may be connected to the electrical system, providing electricity to keep food and beverages cool. The refrigerator 222 may be a freezer or include a freezer compartment. Positioned above the work surface 202 is an oven 223. The oven 223 may be connected to the electrical system, providing electricity for heating food and beverages. In some examples, the oven 223 may be a steam oven.

The microwave 224 may be connected to the electrical system, providing electricity for heating food and beverages. Alternatively, a toaster oven or other food warming device may be used in place of the microwave. The beverage maker 218, the water heater 220, the refrigerator 222, and the microwave 224 may each be connected to the electrical system by an electrical interface to the control panel 1250.

The galley monument configurations described above are examples of various configurations possible using the modular elements each described through reference to one or more figures above. In some implementations, the galley monument configurations are designed for adaptable deployment within an aircraft cabin.

A compartment dedicated to a specific galley appliance insert may be reconfigured to accept another type, such as an oven replaced for a refrigerator, with a change of type of duct extraction and services such as water and electrical connections. When the galley monument is being configured with a number of galley appliance inserts, requirements for each galley appliance insert type can be included in a compartment module selected. For instance, choosing an oven will select all services and components needed for the oven to function operationally and within a designated galley structure. In this way, an overall layout of the galley monument can be compiled from selectable compartment modules.

Turning to FIGS. 3A-3D, various views of a galley structure assembly 1270 are illustrated, according to an example embodiment. The galley structure assembly 1270 may include a panel cover extrusion 1271, a locking extrusion 1272, an angled F section 1274, a structural panel 1276, and a decor panel cover 1278, and may serve to partition spaces such as a galley monument 201*a*-*b* from a seating section on an aircraft cabin and to conceal certain equipment and systems from view. In an example, the decor panel cover 1278 can be used to provide an easily replaceable outer surface for the galley monument in event of accidental damage. In an example, the decor panel cover 1278 can be used to provide an additional layer of thermal insulation for refrigerated galleys. The locking extrusion 1272 may be connected to the angled F section 1274 that slides over a length of the locking extrusion 1272 and locks in place. In an example, the locking extrusion 1272 can be a surface feature the angled F section 1274. In another example, the locking extrusion 1272 is a separate piece that is mechanically attached to the angled F section 1274 by screws (not shown).

The angled F section 1274 may support on a first side a first edge of a first structural panel 1276*a* that slides into a corresponding F section of the angled F section 1274. The angled F section 1274 may support on a second side a first edge of a second structural panel 1276*b* that slides into a corresponding F section of the angled F section 1274. In an example, the structural panel 1276*a* and the second structural panel 1276*b* are permanently bonded into the angled F section 1274 to form an integral part of a structure of the galley monument. The panel cover extrusion 1271 may be connected along the length of the locking extrusion 1272 and intersect a first edge of a first decor panel cover 1278*a* that is adjacent to a side of the structural panel 1276*a*. The panel cover extrusion 1271 may also intersect a first edge of a second decor panel cover 1278*b* that is adjacent to a side of the second structural panel 1276*b*.

Further, steps for a method of entrapping and securing galley exterior panels to allow easy fitting and removal from the floor 103 may include sliding a panel cover extrusion 1271 over a locking extrusion 1272, affixing a locking extrusion 1272 to an angled F section 1274, connecting a first edge of a first structural panel 1276*a* to a first side of an angled F section 1274, connecting a first edge of a second structural panel 1276*b* to a second side of an angled F section 1274, and clipping a first decor panel cover 1278*a* and a second decor panel cover 1278*b* to the structural panel 1276*a* and the structural panel 1276*b*, respectively. In some implementations, the structural panels 1276 (1276*a*, 1276*b*) and the decor panel cover 1278 may be installed and removed without the use of tools, and may not have any fasteners visible. Use of the decor panel cover 1278 may also provide a layer of thermal insulation between an inner surface and an outer surface of the decor panel 1278 or the structural panel 1276, particularly if an air gap and/or foam core layer is positioned in between the inner and the outer surfaces. In an example, the decor panels include a foam core for providing thermal value. In some implementations, a vacuum insulation panel (VIP) can be placed with the air gap to enhance existing thermal value (not shown).

Figure 3A:
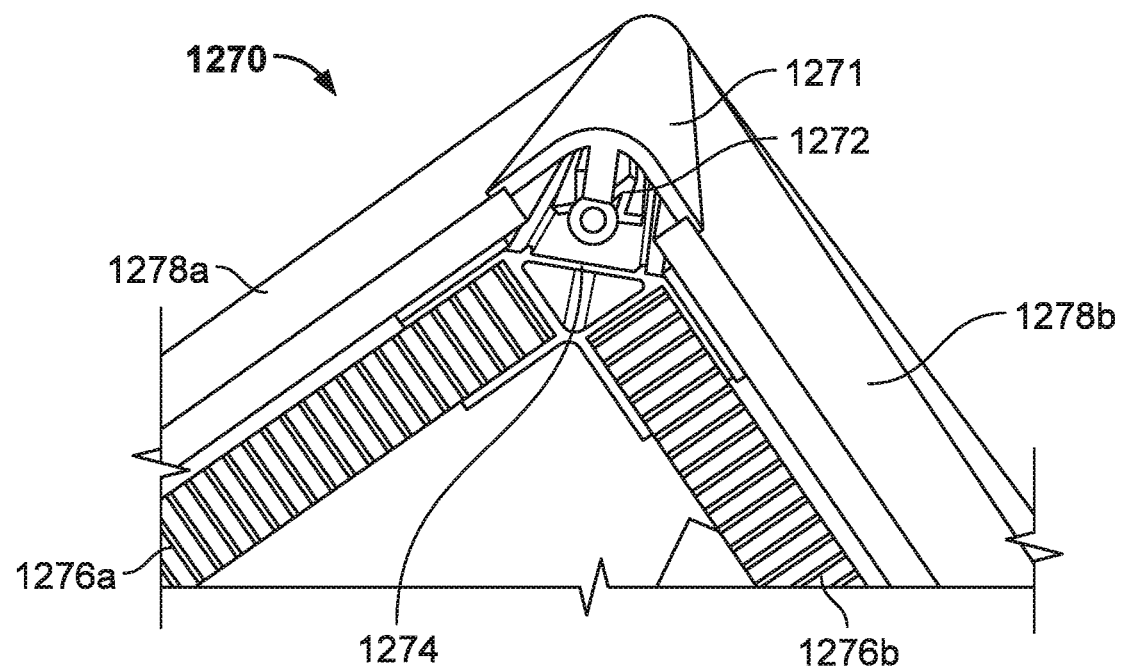
FIGS. 3A-3D represent various views of a galley structure assembly, according to an example embodiment.
Figure 3B:
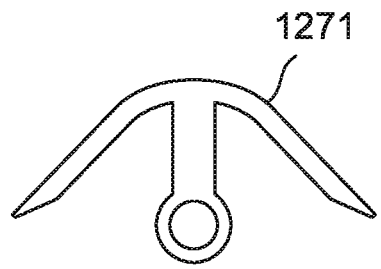
Figure 3C:
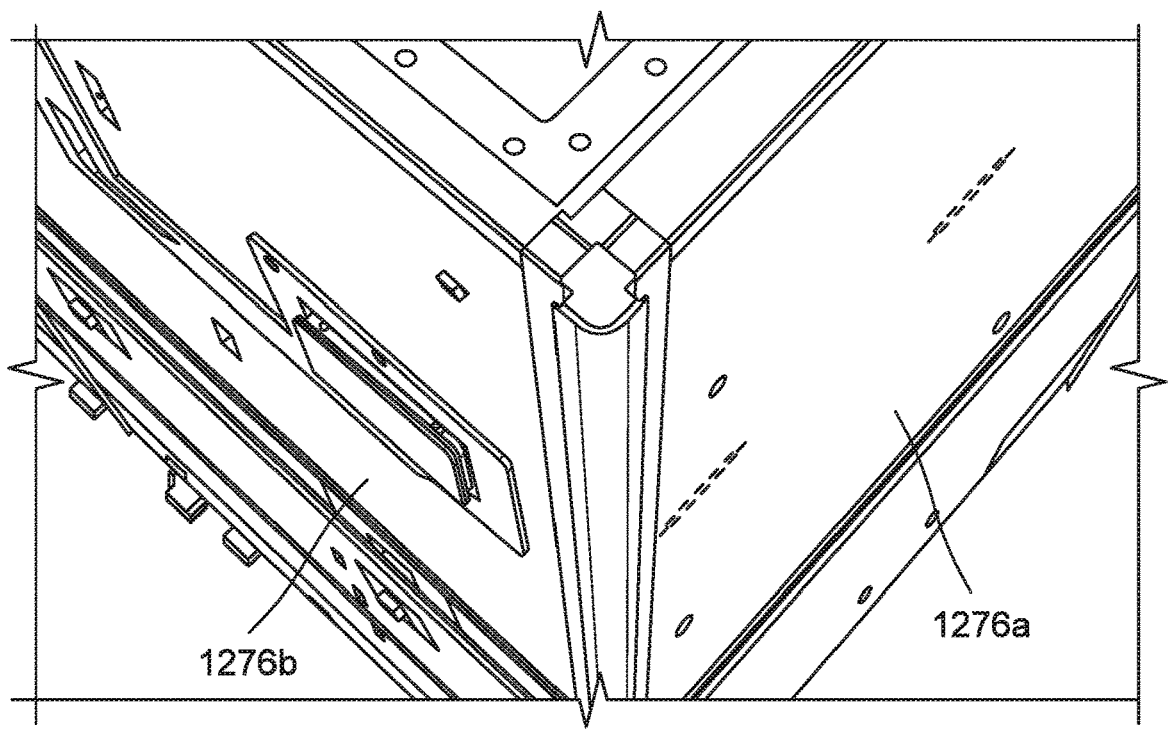
Figure 3D:
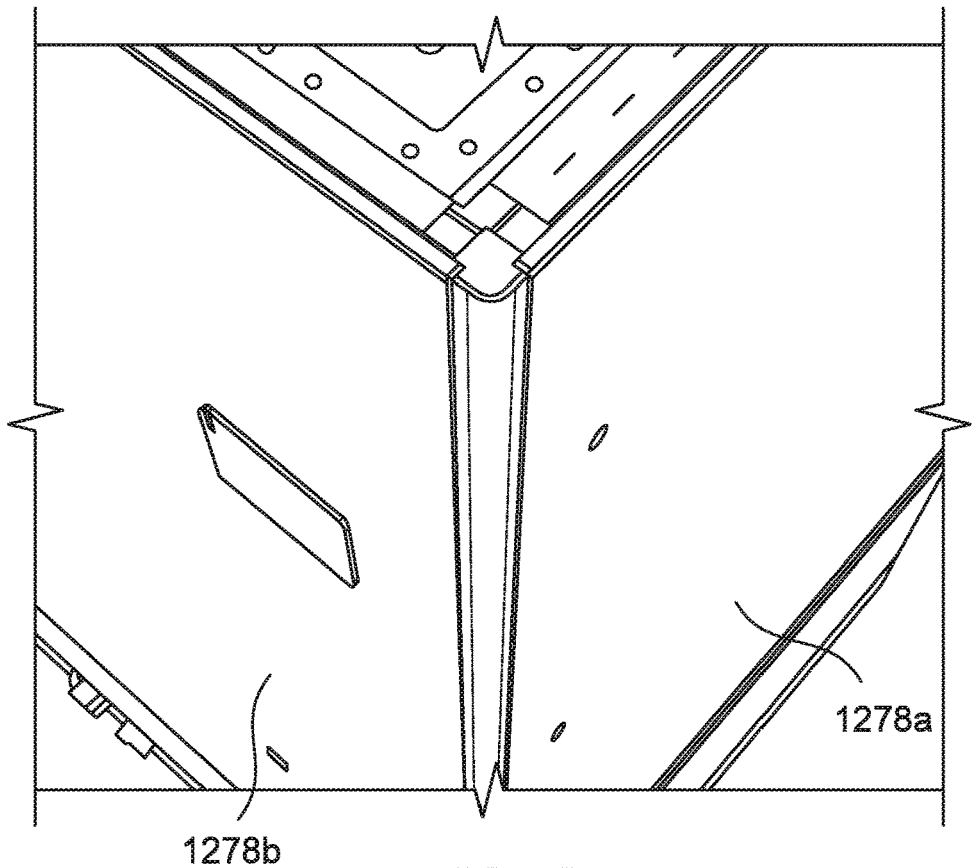

FIG. 3C is a perspective view of the galley structure assembly 1270 including the first structural panel 1276a to the first side of the angled F section 1274 and the first edge of the second structural panel 1276b to the second side of the angled F section 1274. FIG. 3D is a perspective view of the galley structure assembly 1270 including the decor panel cover 1278a covering the first structural panel 1276a and the decor panel cover 1278b, held in place by corner extrusion 1271, covering the second structural panel 1276b.

Example galley mounting systems are further described by related U.S. patent application Ser. No. 15/648,165 entitled "Aircraft Monument Floor Mounting System" and filed Jul. 12, 2017, hereby incorporated by reference in its entirety.

Figure 3E:
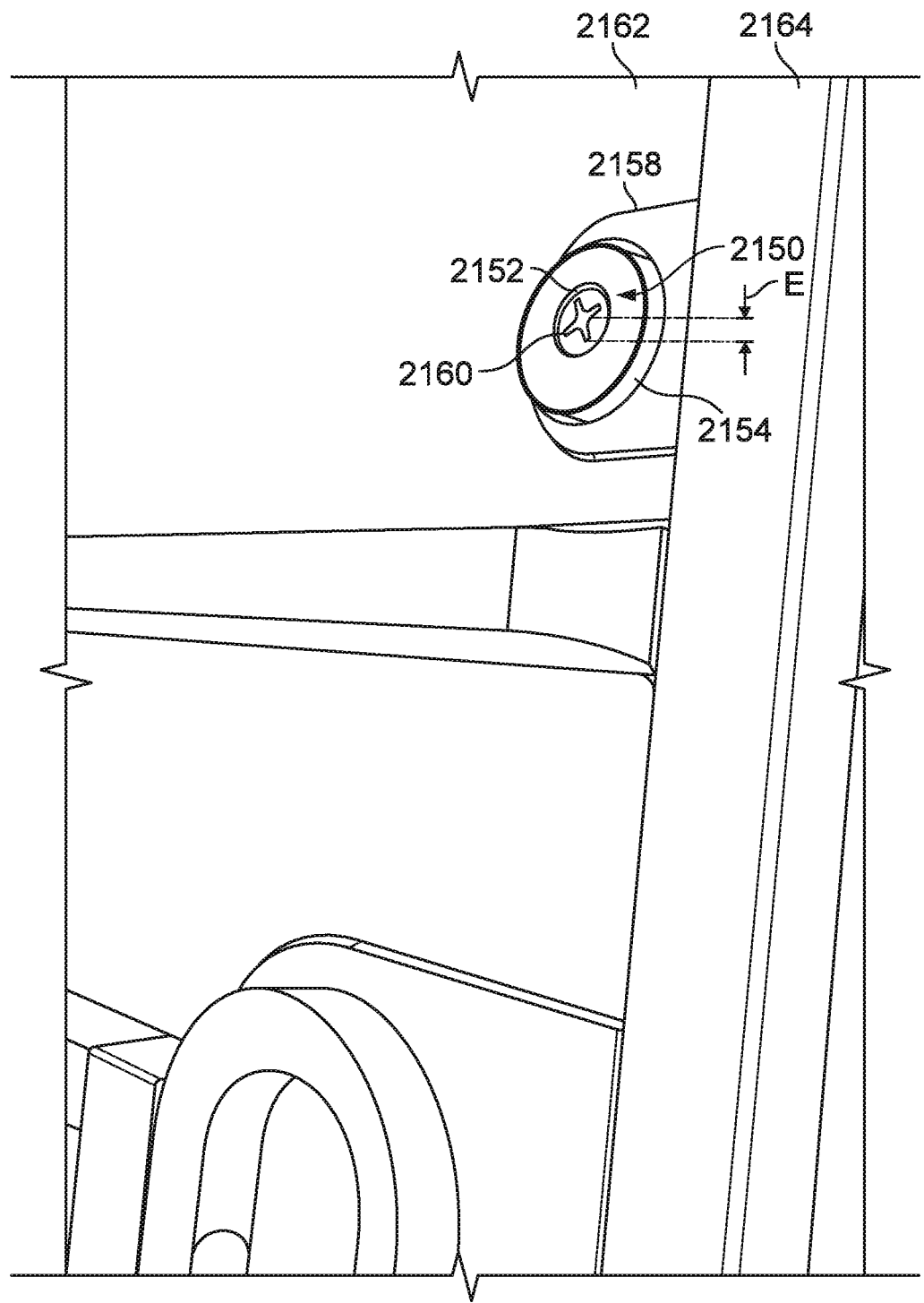
FIG. 3E is a perspective view of an eccentric adjuster, according to an example embodiment.

In some implementations, a modular galley monument can be assembled with one or more eccentric adjusters for properly aligning galley doors and door bumpers mounted to the galley monument. FIG. 3E is a perspective view of an eccentric adjuster 2150, according to an example embodiment. The eccentric adjuster 2150 is connected to a compartment sidewall 2162 and allows relative adjustment of a door bumper 2164 for aligned closure of a compartment door (not shown) that is hingeably connected to a galley monument when the compartment door is in a closed position. The eccentric adjuster 2150 may have a round or circular disc shape and include a mounting hole 2152 offset from a center of the eccentric adjuster 2150. The eccentric adjuster 2150 may be positioned over or within an o-ring 2154 and secured by a fastener 2160 through the mounting hole 2152 to a sidewall of a galley wall or compartment (illustrated as compartment sidewall 2162). The o-ring 2154 may be designed to be positioned between the eccentric adjuster 2150 and the compartment sidewall 2162. The compartment sidewall 2162 may include an adjuster recess 2158 where the o-ring 2154 and the eccentric adjuster 2150 may be mounted.

Alternatively, the eccentric adjuster 2150 and the o-ring 2154 may be located on and secured to a galley monument at a position that would contact a surface of the compartment door 2156 when the compartment door 2156 is in a closed position, rather than connected to the door bumper 2164. A center of the mounting hole 2152 may be located a distance E from a center of the eccentric adjuster 2150, E defining an amount of eccentricity of the eccentric adjuster 2150 such that rotation of the eccentric adjuster 2150 about the mounting hole 2152 and fastener 2160 alters a depth of the eccentric adjuster 2150 with respect to a mounting surface such as the compartment sidewall 2162 or the galley monument. The eccentric adjuster 2150 may be disc shaped and have varying thickness. In this way, rotational adjustment of the eccentric adjuster 2150 about the fastener 2160 changes the relationship of the eccentric adjuster 2150 with the compartment sidewall 2162 and/or the galley monument in a case the compartment door 2156 is in a closed position, either by pushing the compartment door 2156 outward from the galley or allowing the compartment door 2156 to move closer toward the galley monument or compartment sidewall 2162.

Alternatively, the eccentric adjuster 2150 and the o-ring 2154 may be located on and secured to a compartment door at a position that would contact a surface of the galley monument when the compartment door 2156 is in a closed position, rather than connected to the compartment sidewall 2162.

Steps for a method of aligning a compartment door 2156 to a galley monument or compartment 215 may include rotating the eccentric adjuster 2150 to alter an effective thickness of the eccentric adjuster 2150 positioned between an inner surface of the compartment sidewall 2162 and a galley monument, in a case where the compartment door 2156 is in a closed position and may be in contact against the galley monument.

Modular Doors and Door Assembly

In some implementations, a galley monument can include a modular door and door assembly including at least one of a pivoting door assembly (FIGS. 4A-4B), a hinged rotating door (FIG. 6), and a compartment door having a door support (FIGS. 7A-7D).

In some implementations, a modular galley monument can include a door assembly configured to have a number of pivots for folding action while preventing air leakage. In an example, the number of pivot points can be minimized to reduce air gaps. FIGS. 4A-4B represent perspective views of a door assembly 1350 in a first position and a second position, respectively, according to an example embodiment. The door assembly 1350 may be connected to a chilled compartment 1352 such as a galley compartment for a chilled trolley 211, 213 and may include a door 1354, a hinge body 1356, an articulation point 1358, an articulation limiter 1360, a seal 1362, and a door stop 1364.

A first edge of the hinge body 1356 may be rotatably connected to the articulation point 1358, the hinge body 1356 able to articulate relative to the chilled compartment 1352 about the articulation point 1358. A second edge of the hinge body 1356 may be rotatably connected about the articulation limiter 1360. The articulation limiter 1360 may be further rotatably connected to a first edge of the door 1354. The door 1354 may be able to articulate relative to the hinge body 1356 about the articulation limiter 1360. The hinge body 1356 may be designed such that the articulation of the door 1354 about the hinge body 1356 is limited to less than one hundred eighty degrees, preventing an outward facing surface of the door 1354 (viewed from when the door 1354 is in a closed position) from coming into contact with an outside facing surface of the hinge body 1356.

The door stop 1364 may be connected to an inside facing surface of the door 1354 (in a case where the door 1354 is in a closed position) to, for example, guide or position the door 1354 to form an airtight seal with the chilled compartment 1352, or to prevent closure of the door 1354 in a case where an object connected to the chilled compartment 1352, for example a turn button, is not positioned appropriately. The articulation 1358 may be symmetrical vertically and horizontally, allowing installation of the hinge body 1356 either way vertically to allow the use of the same part for either left or right hand hinging directions.

The seal 1362 may be connected to an inside facing surface of at least one of the hinge body 1356 and the door 1354 that faces an edge of the chilled compartment 1352 when the hinge body 1356 and the door 1354 are in a closed position, sealing the hinge body 1356 and/or the door 1354 to the chilled compartment 1352 to maximize air tightness within the chilled compartment 1352. The hinge body 1356 may include at least one articulation point 1358 and at least one articulation limiter 1360, and the door assembly 1350 may include at least one door stop 1364.

Figure 5A:
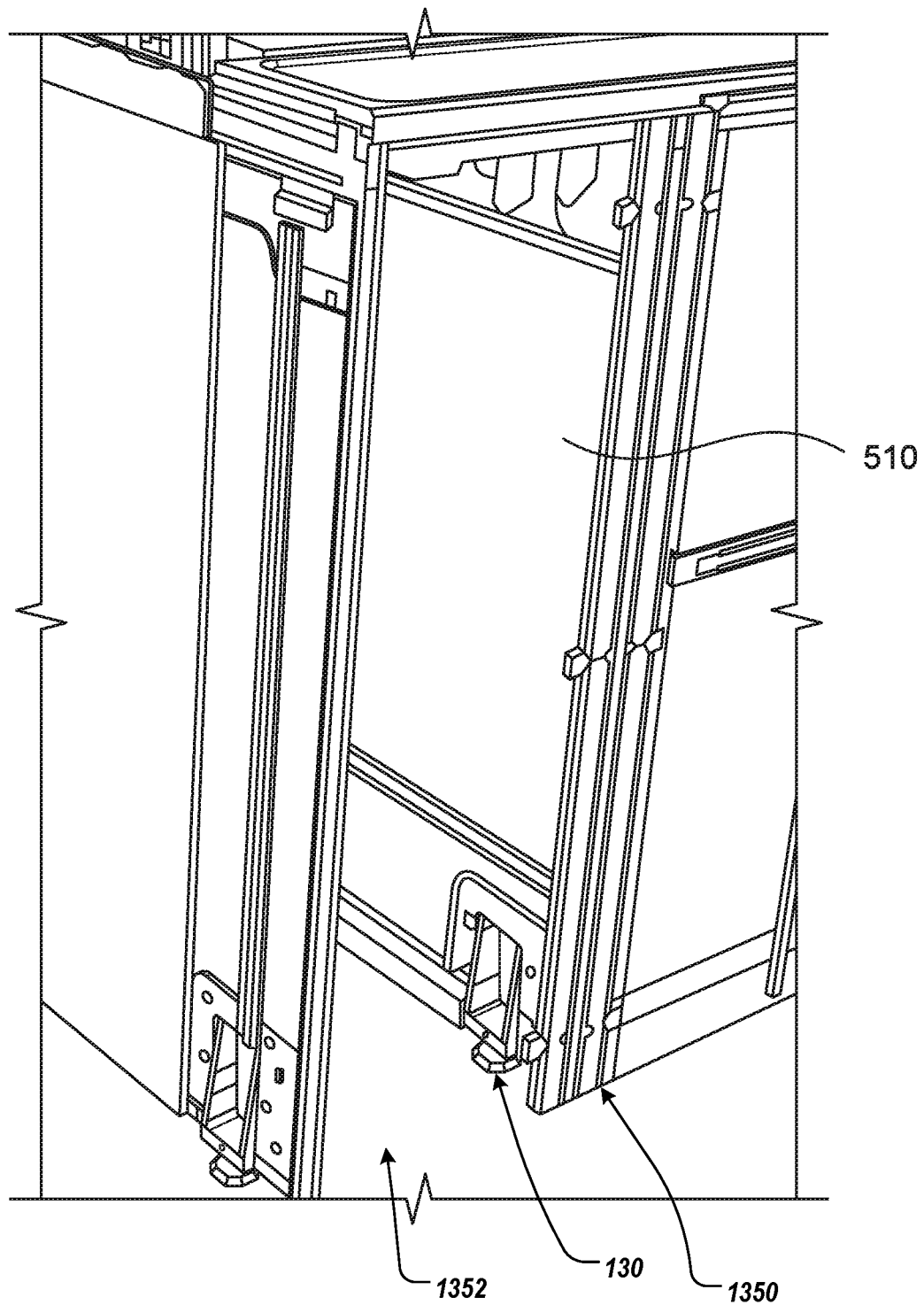
FIG. 5A represents a perspective view of a door assembly covering a partitioned galley monument, according to an example embodiment.
Figure 5B:
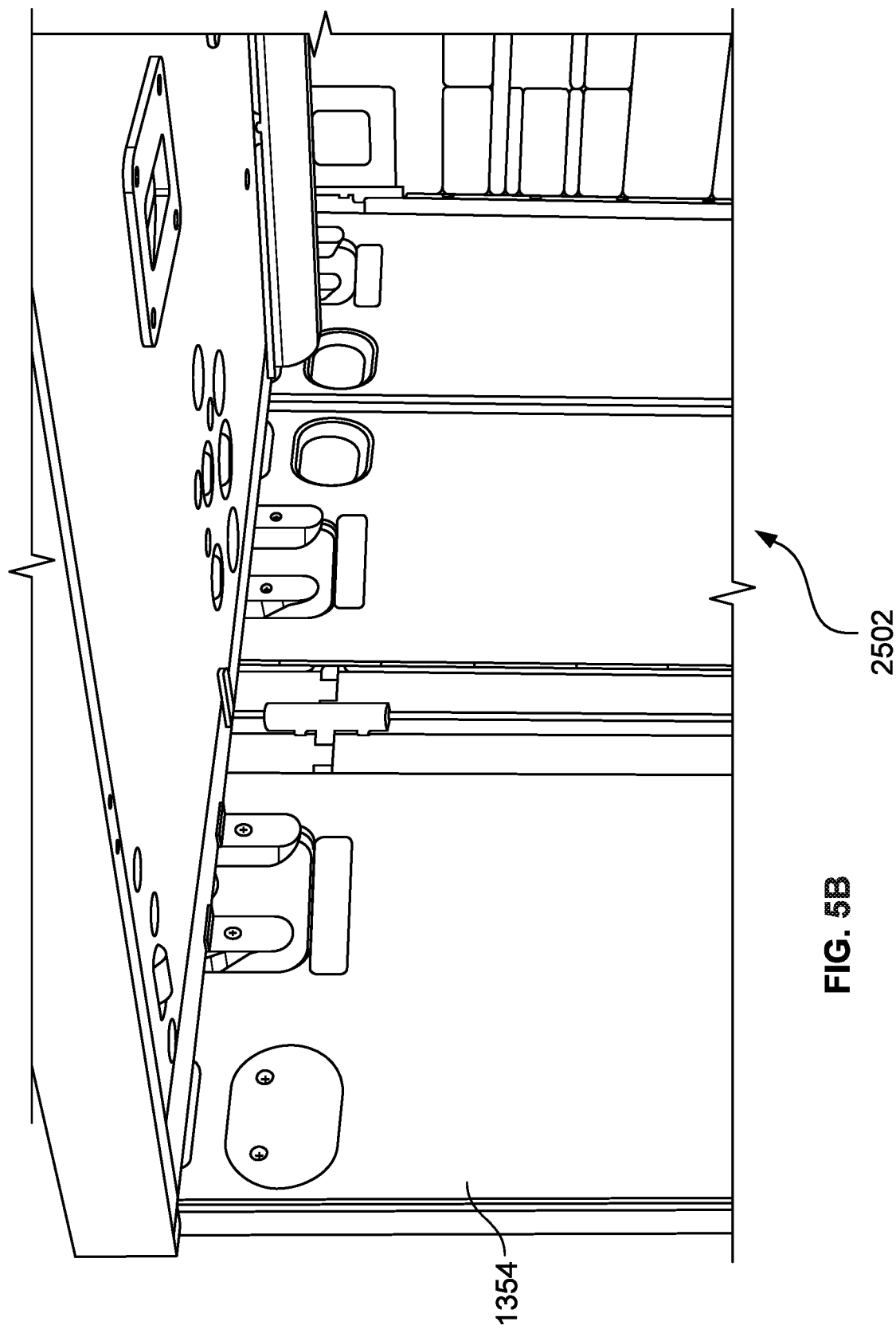
FIG. 5B represents a perspective view of a door assembly from within a galley monument, according to an example embodiment.

FIG. 5A represents a perspective view of a partial door assembly configured for covering a partitioned galley monument, according to an example embodiment. In an example, the partitioned galley monument is partitioned with an interior wall 510. As shown, the door has been omitted on the left side of this view where the hinge itself less the door panel is shown of the door assembly 1350. A complete hinge and door is shown on the right side. In an example, the interior wall 510 can be used to form the chilled compartment 1352 within the partitioned galley monument. In an example, the interior wall 510 can be secured with a floor attachment such as the securement system 130. FIG. 5B illustrates a perspective view from within a galley monument configured to form one or more trolley bays, according to an example embodiment. In an example, the galley monument may be configured to include a trolley bay 2502 for the storage of different sized trollies such as at least one half size trolley 212 or half size chilled trolley 213.

Figure 6:
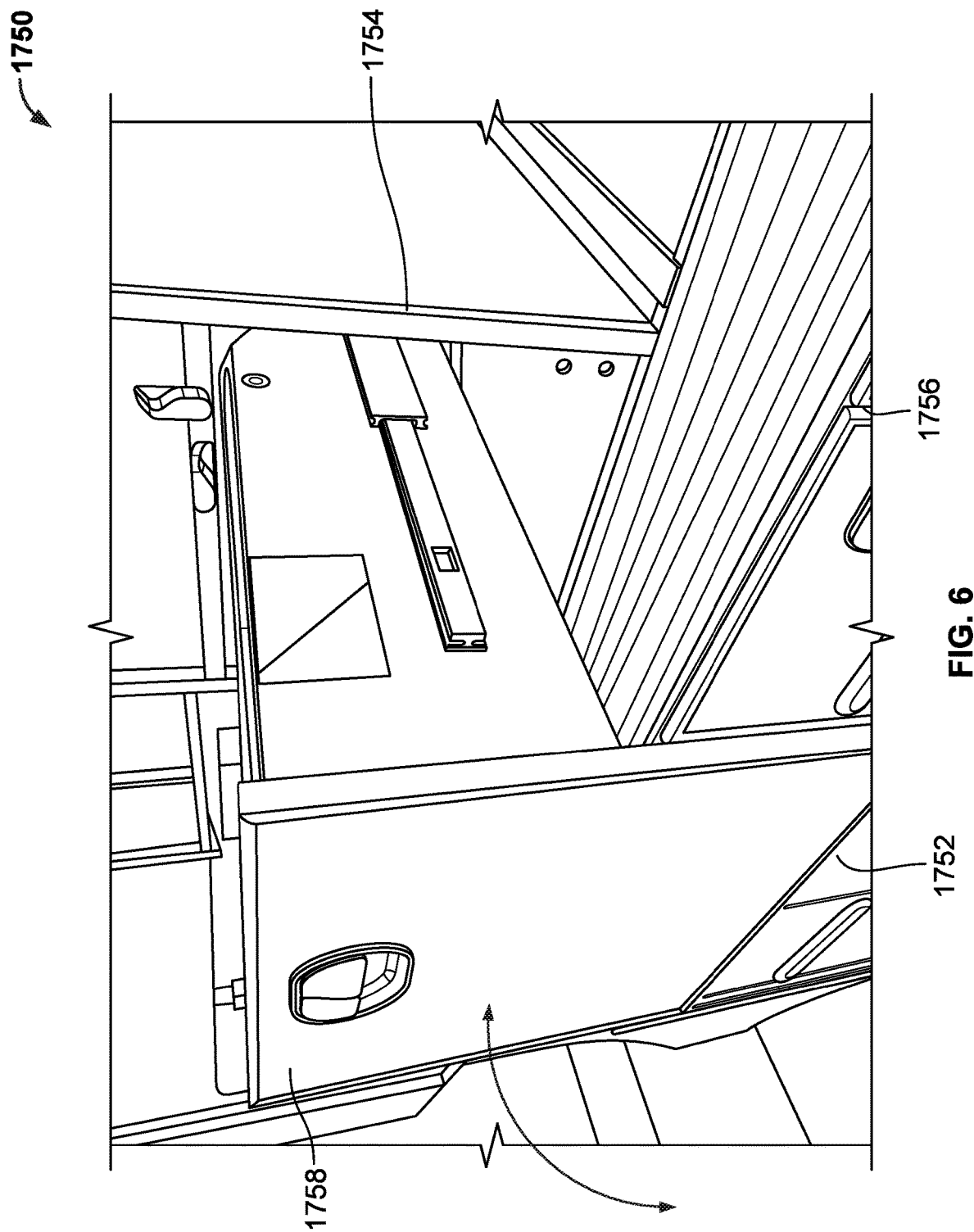
FIG. 6 is a perspective view of a supplementary ice drawer, according to an example embodiment.

FIG. 6 is a perspective view of a supplementary ice drawer 1750 having a hinged supplementary door 1758 configured to rotate downward to open, according to an example embodiment. The supplementary ice drawer 1750 may be located within a compartment 1754 and include a supplementary door 1758. The compartment 1754 may be positioned directly above a primary ice drawer 1752 located within a compartment 1756. Both the supplementary ice drawer 1750 and the primary ice drawer 1752 may each be slideably connected to the compartment 1754 and the compartment 1756, respectively, such that the supplementary ice drawer 1750 and the primary ice drawer 1752 may be independently opened and closed. The supplementary door 1758 may be hinged to the supplementary ice drawer 1750 such that it rotates downward to open. At least one of the supplementary ice drawer 1750, the primary ice drawer 1752, and the supplementary door 1758 may be insulated. Both the supplementary ice drawer 1750 and the primary ice drawer 1752 may be used for ice storage.

However, by having separate drawers, ice in the supplementary ice drawer 1750 may remain undisturbed for longer periods of time, and therefore melt more slowly, than ice stored in the primary ice drawer 1752 since the primary ice drawer 1752 may be more frequently accessed while in service and unable to maintain as constant an internal temperature as that of the supplementary ice drawer 1750. The supplementary ice drawer 1750, however, may only need to be accessed once the primary ice drawer 1752 is nearly depleted. The primary ice drawer 1752 may be open at its top, allowing ice from the supplementary ice drawer 1750 to be dropped into the primary ice drawer 1752 in a case where the primary ice drawer 1752 is in an extended, open position and the supplementary door 1758 of the supplementary ice drawer 1750 is in an open, downward position.

In some implementations, a modular galley monument can include a modular compartment wall door configured to open within a limited opening such as between walls within a single galley monument as well as between facing galley monuments. FIGS. 7A-7D represent perspective views of a folding compartment door 1500, according to an example embodiment. In an aspect, the folding compartment door 1500 may be a waste compartment door. In an example, the folding compartment door 1500 can be configured to provide access to an integrated galley trash compactor including a bin that is removable through a folding compartment opening 1502. The compartment door, in some embodiments, is a maintenance access door for providing access to an appliance or a galley system. For example, the maintenance access door may provide access to an air chilling unit.

Figure 7A:
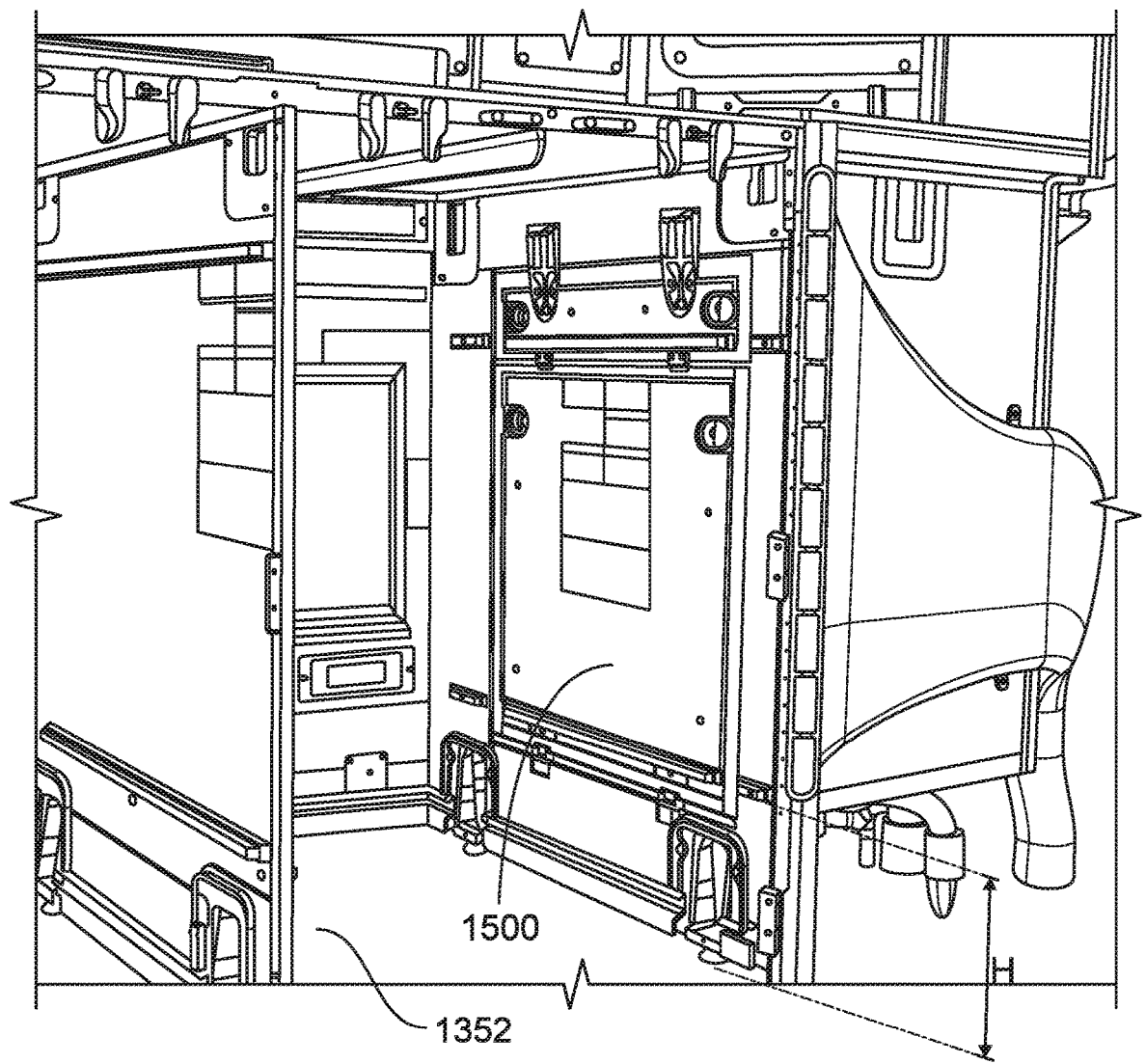
FIGS. 7A-7D represent perspective views of a folding compartment door, according to an example embodiment.
Figure 7B:
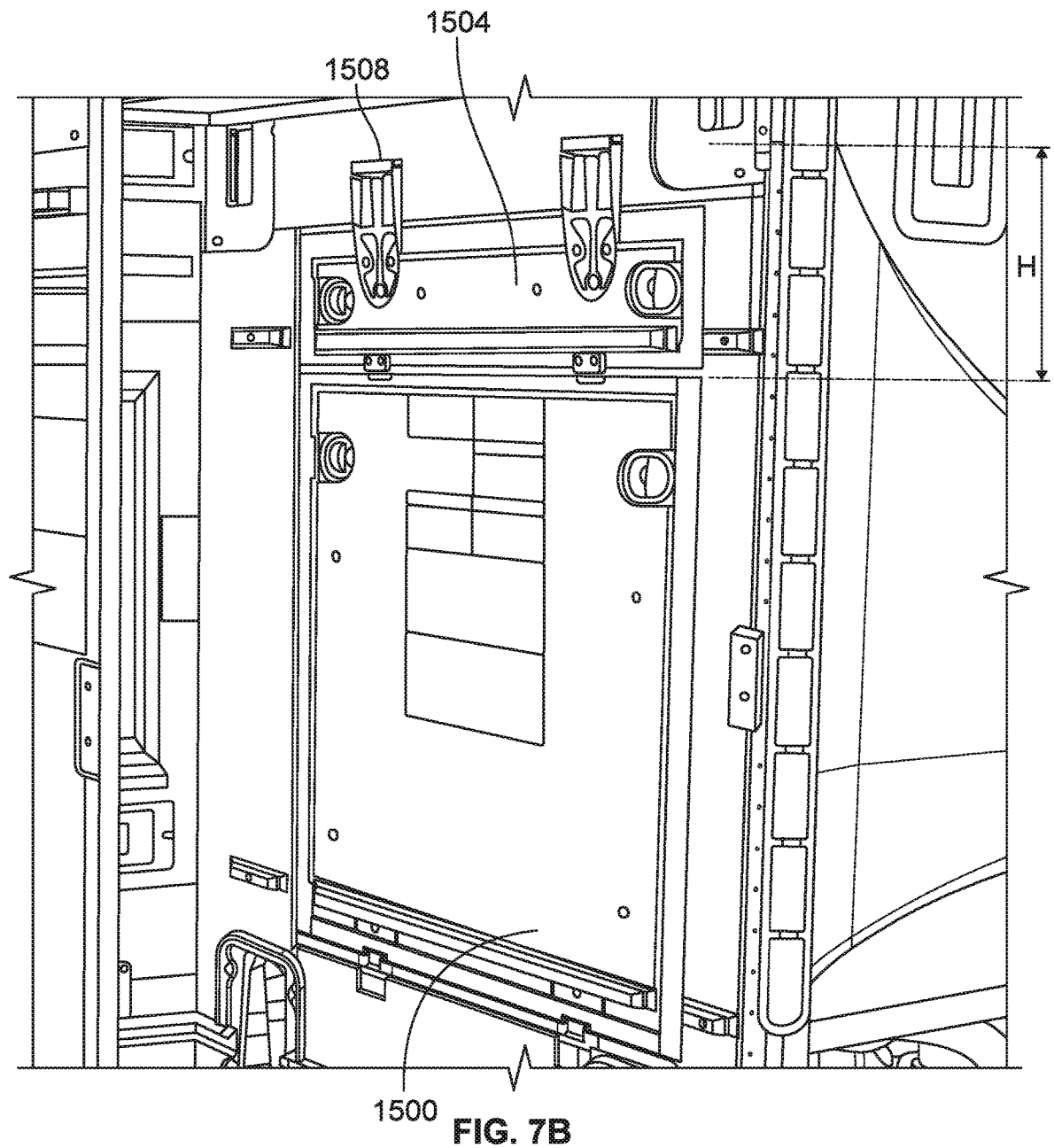

In an example, the folding compartment door 1500 may be connected to the folding compartment opening 1502 by a door support hinge 1506, and may include a door support 1504. The folding compartment opening 1502 may be located on a side of a compartment 1501 facing a galley trolley bay 1706. FIG. 7A shows a view looking into a chilled compartment 1352 of the galley monument which allows access to the compartment 1501 via the folding compartment door 1500. A lower edge of the folding compartment opening 1502 may be rotatably connected to the door support hinge 1506, the door support hinge 1506 further connected to a first edge of the folding compartment door 1500, allowing the folding compartment door 1500 to be opened and closed by articulation of the folding compartment door 1500 about the door support hinge 1506.

Figure 7C:
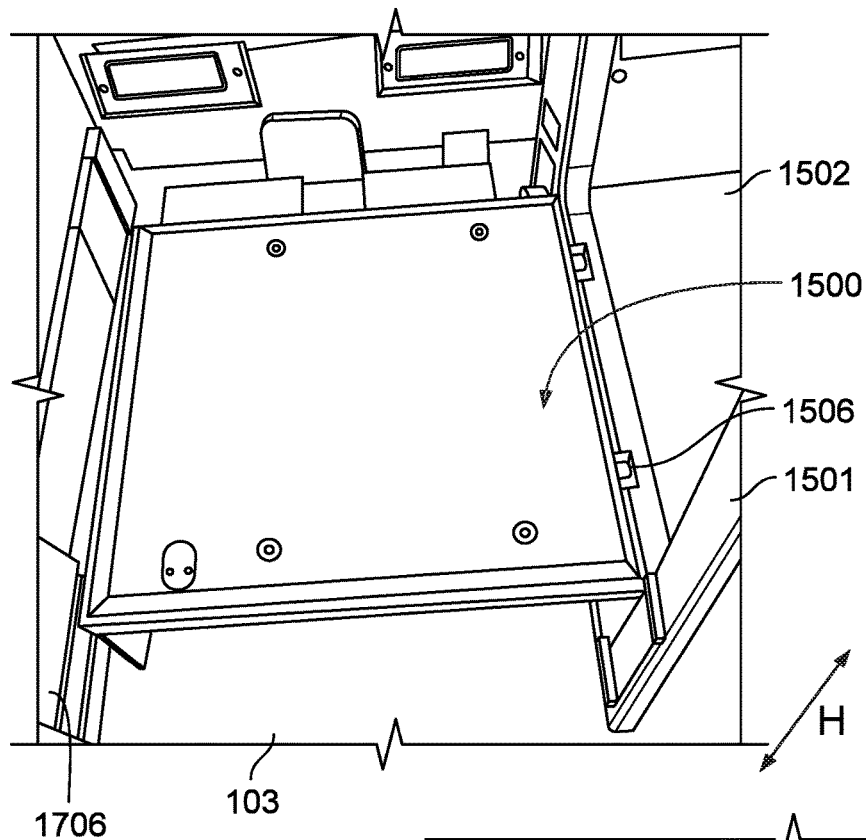
Figure 7D:
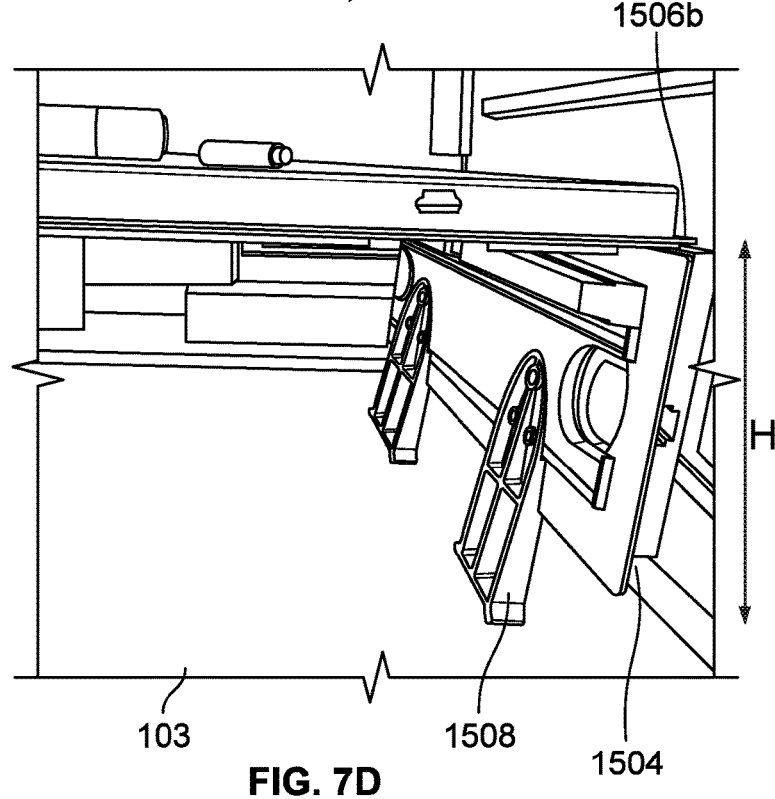

FIG. 7C shows a perspective showing a backside of the folding compartment door 1500 and a raised floor of an interior of the compartment. In an example, the backside of the folding compartment door 1500 can be configured to be level with the raised floor of the interior of the compartment. In case of the compartment storing a bin, a level backside of the folding compartment door 1500 can the bin to slide out onto the compartment. As shown, FIG. 7D is a reversed or mirrored perspective of the view in FIG. 7C. The lower edge of the folding compartment opening 1502 can be positioned a distance H above a floor 103 of the aircraft.

For a back surface of the folding compartment door 1500 to be used as a level support platform during a process of emptying waste from inside the compartment 1501 out onto the folding compartment door 1500, the folding compartment door 1500 may be further hinged by a door support hinge 1506b along a second edge of the folding compartment door 1500 that is parallel to the first edge of the folding compartment door 1500. The second edge of the folding compartment door 1500 may be located at approximately the distance H below an upper most edge of the folding compartment opening 1502 in a case where the folding compartment door 1500 is in a closed position with the folding compartment opening 1502.

The door support 1504 is approximately the same size and shape as the remaining area of the folding compartment opening 1502 not covered by the folding compartment door 1500 in a case where the folding compartment door 1500 is in a closed position against the folding compartment opening 1502. The area formed by the door support 1504 may have a height that spans the distance H and have a horizontal width approximately equal to that of the folding compartment door 1500 in a case where the shape of the folding compartment opening 1502 is approximately rectangular.

In another example, the door support 1504 may also include a door support leg 1508 (illustrated in FIGS. 7B and 7D) having a first end and a second end, the first end of the door support leg 1508 connected to the door support 1504 and allowing the second end of the door support leg 1508 to contact the floor 103 instead of the door support 1504 being in contact with the floor 103 itself, when the folding compartment door 1500 is opened from the folding compartment opening 1502 and used as a support platform. In this case, the area covered by the door support 1504 may be smaller because, while the width of both the folding compartment door 1500 and the door support 1504 may remain approximately the same as that of the folding compartment opening 1502, the height of the door support 1504 may be reduced if the door support leg 1508 projects further than an edge of the door support 1504. In other words, the effective combined height of the door support 1504 and the door support leg 1508 is approximately the same as the distance H for the folding compartment door 1500 to remain substantially level in an open position as a support platform.

In other embodiments, the door support 1504 may include more than one door support leg 1508, the more than one door support leg 1508 positioned in parallel on the door support 1504 such that all the door support legs 1508 uniformly contact the floor 103.

Plumbing System

In some implementations, a modular galley monument can include a distributed plumbing system servicing different portions of the galley monument including at least one of a sump to collect liquid channeled from a work deck (FIGS. 8A-8C), a service column drip tray assembly (FIGS. 9A-9D), and a double cavity drip tray (FIGS. 10A-10E).

Figure 8A:
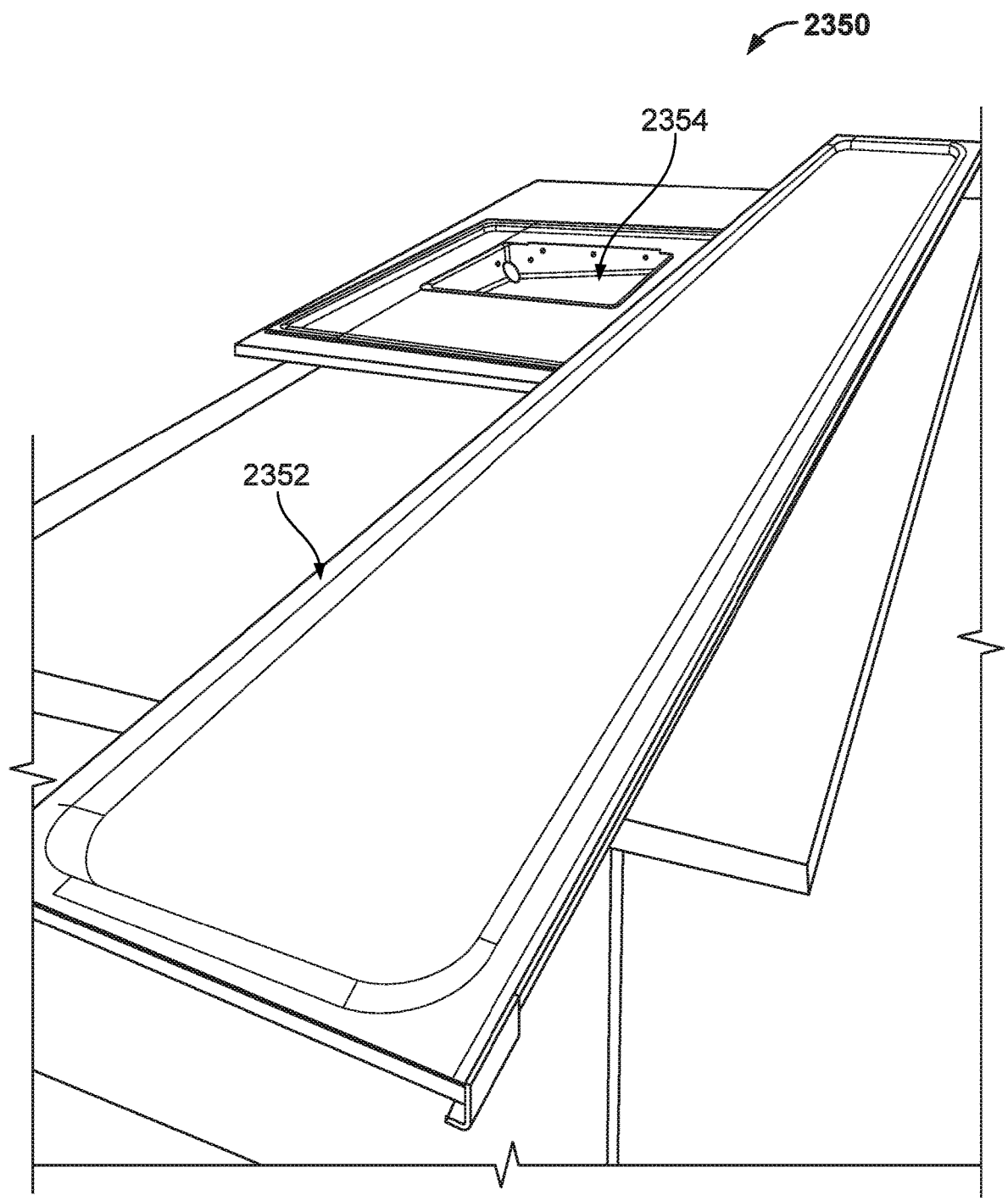
Figure 8B:
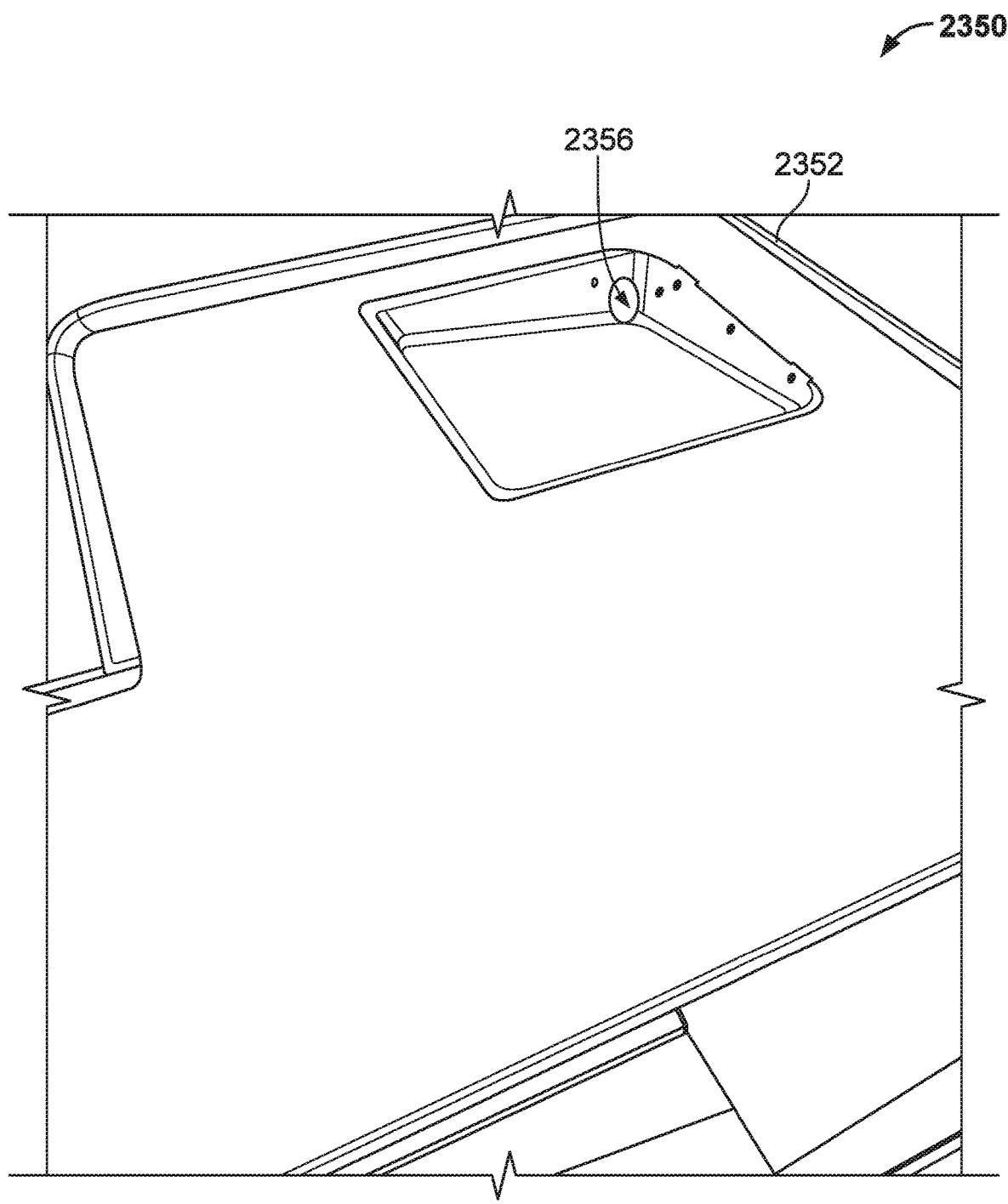

FIGS. 8A-8C represent various views of a work deck 2350 mounted on the work surface 202, according to an example embodiment. The work deck 2350 may be designed to retain and channel spilled liquids, and may be formed of metal, plastic, or a composite material. The work deck 2350 may include a lip 2352 surrounding some or all of the perimeter of the work deck 2350 to retain liquid, a sump 2354 to collect liquid channeled from the work deck 2350, and a drain spigot 2356 to allow liquid to be evacuated to below the sump 2354.

Figure 9A:
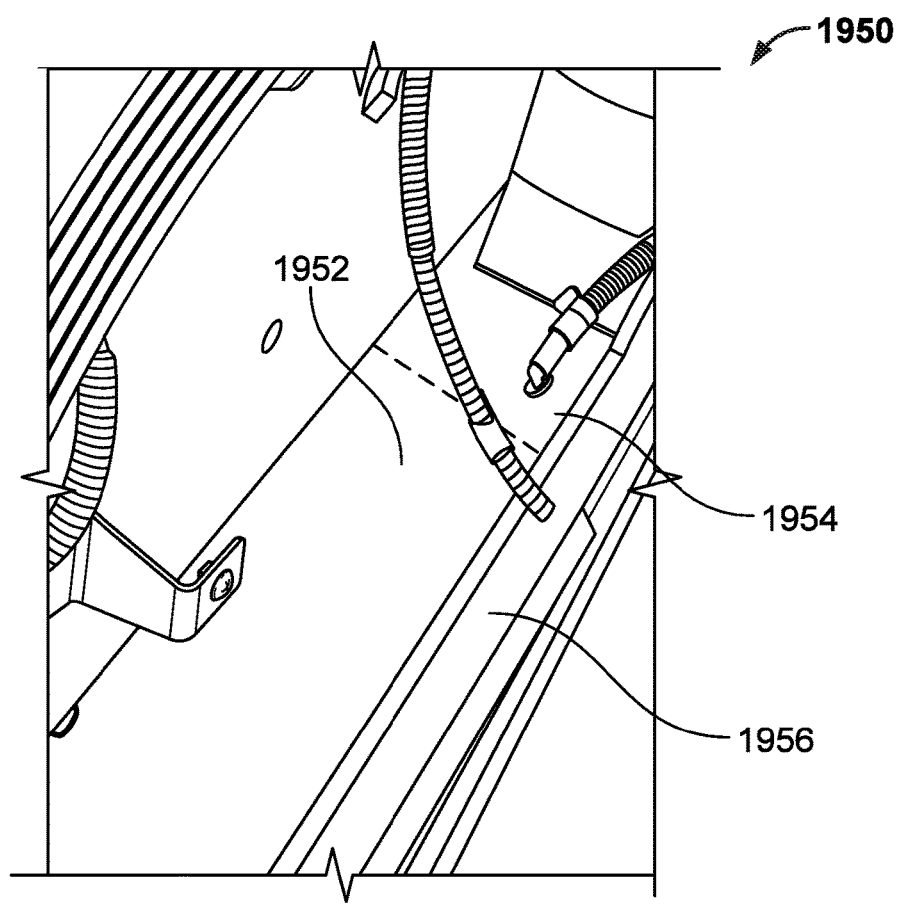
FIGS. 9A-9D represent various views of a service column drip tray assembly, according to an example embodiment.
Figure 9B:
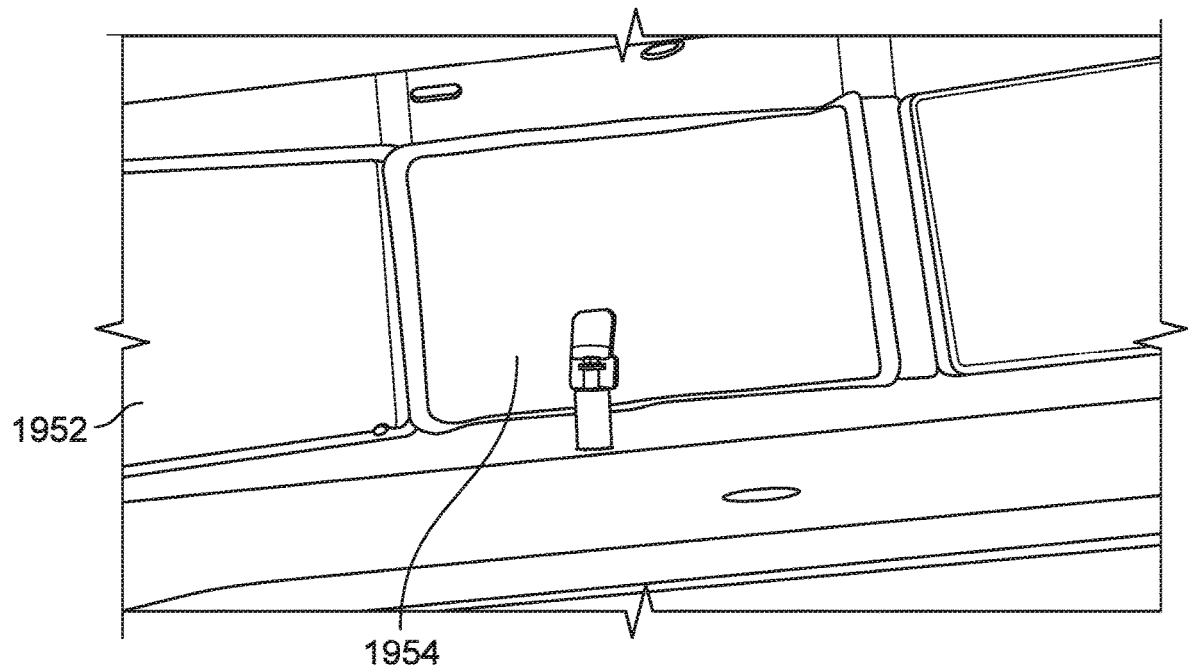
Figure 9C:
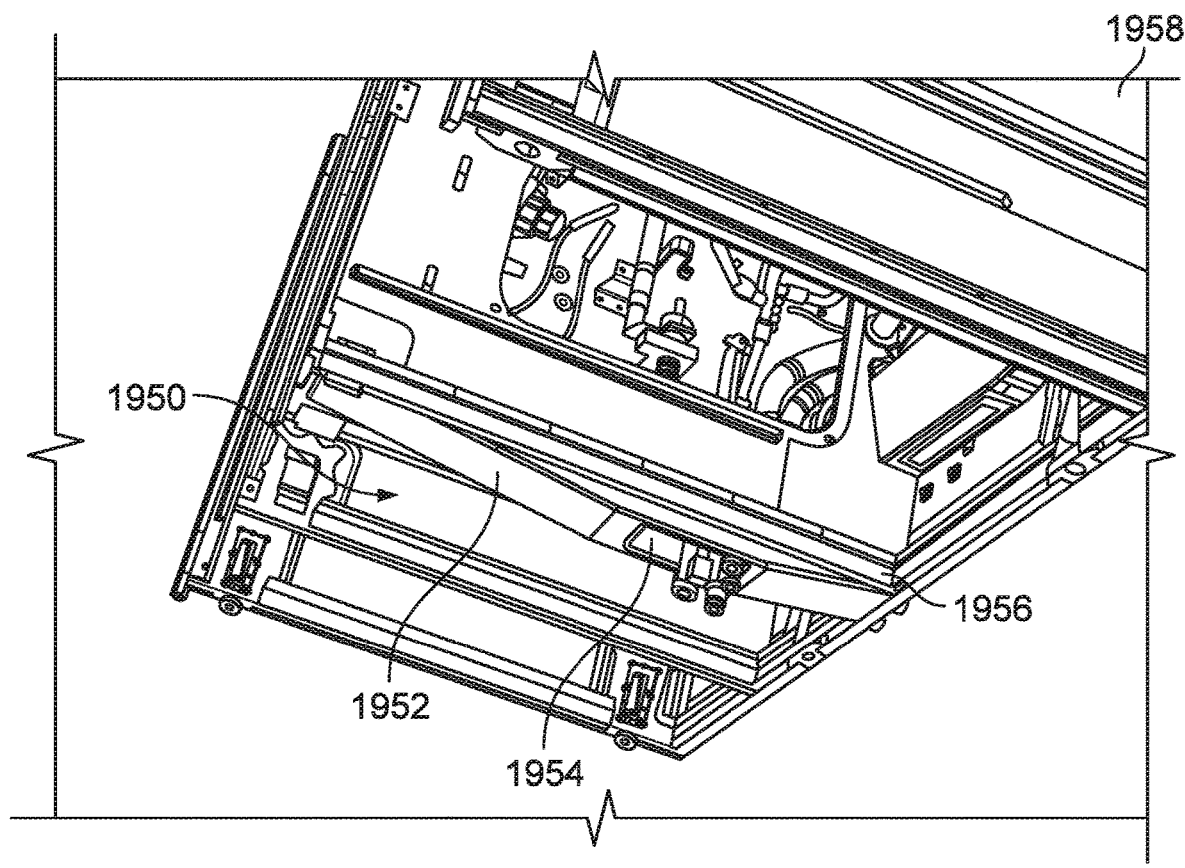
Figure 9D:
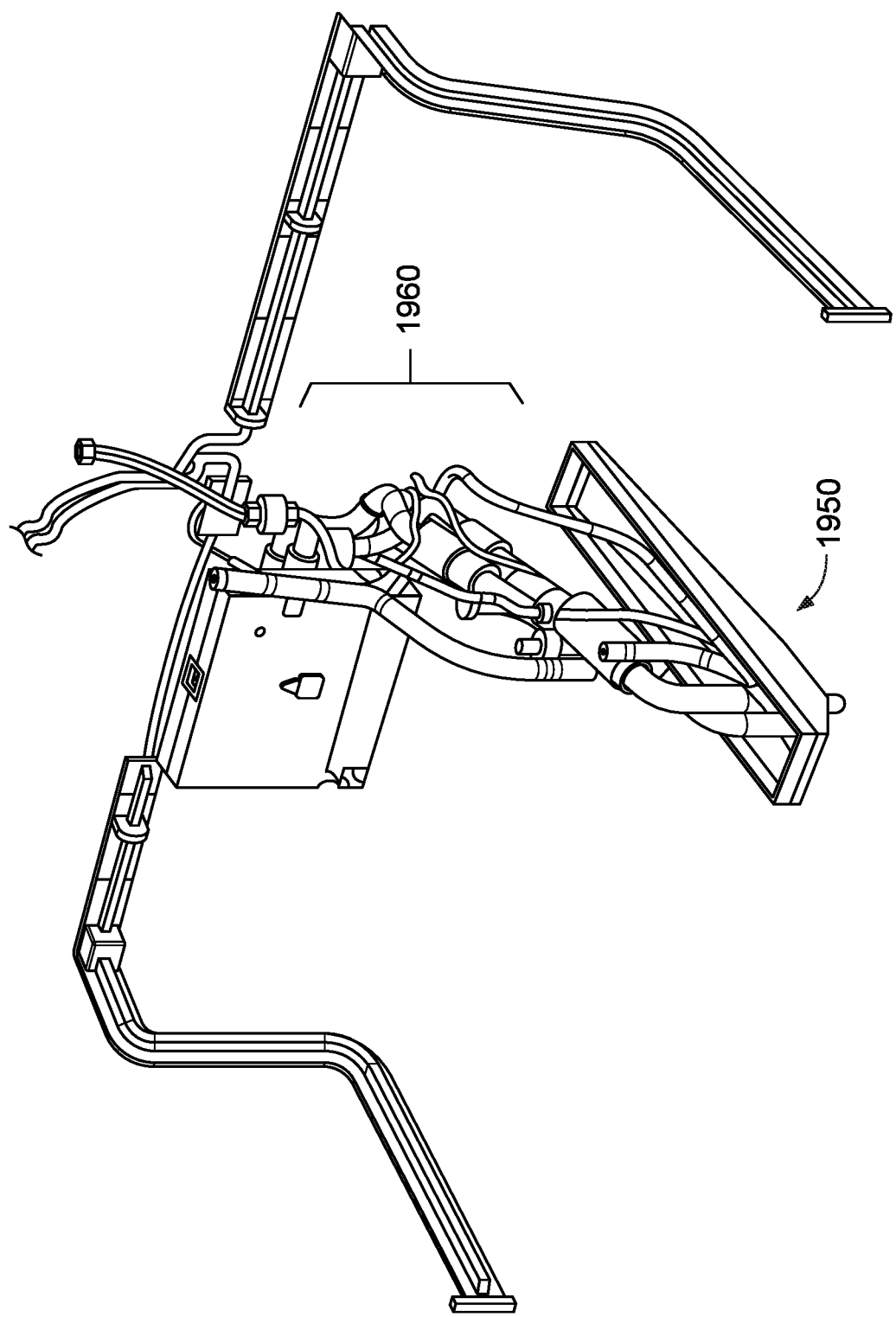
Figure 10C:
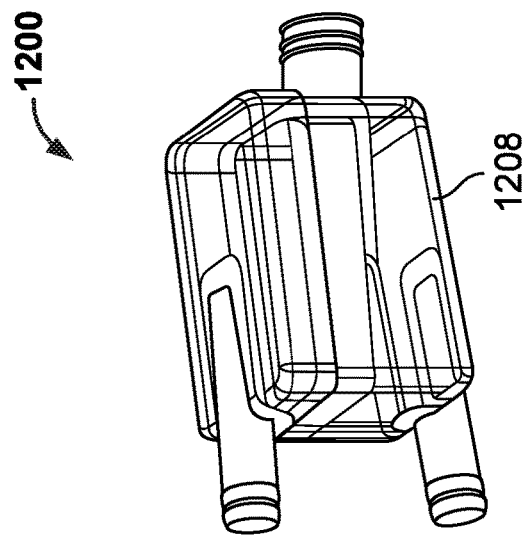
FIGS. 10A-10E represent views of a double cavity drip tray, according to an example embodiment.
Figure 10E:
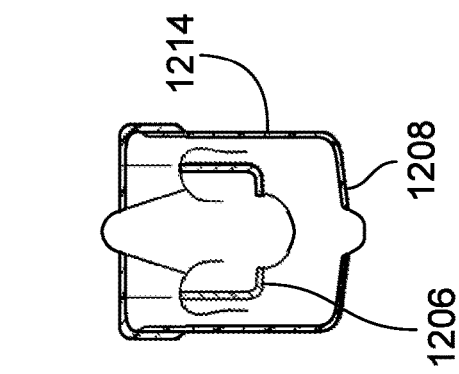
Figure 10B:
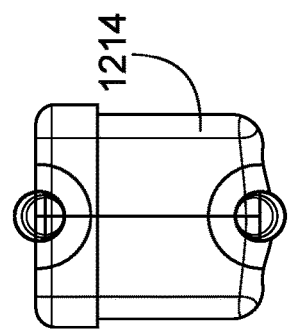
Figure 10A:
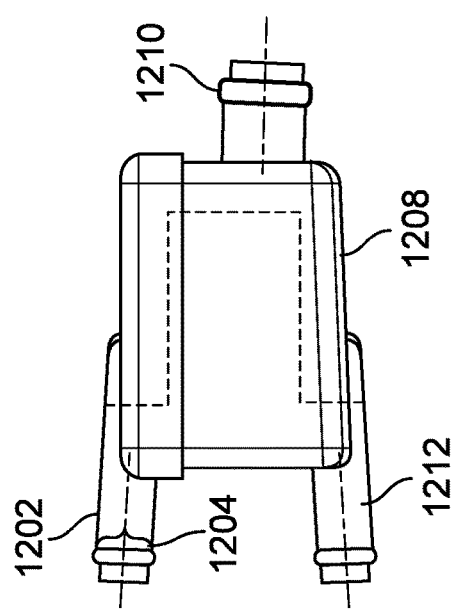
Figure 10D:
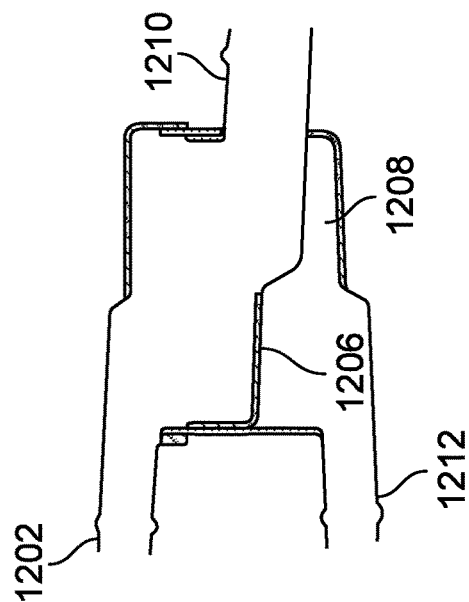

FIGS. 9A-9D represent various views of a service column drip tray assembly 1950, according to an example embodiment. FIG. 9C is a bottom tilted perspective of a galley 1988 showing the service column drip tray assembly 1950 positioned at or near the bottom of and bonded to a central column 1956 of the galley 1958. The service column drip tray assembly 1950 may include a drip tray 1952 and a sump 1954. The drip tray 1952 may collect condensation and spillage from a galley plumbing system 1960. Liquid may then flow out through the sump 1954, the sump 1954 being repositionable within the central column 1956 and the drip tray 1952, allowing for the same design to be adapted to multiple configurations of central column 1956 and galley 1958. In an example, the sump 1954 can be oriented (turned through 180 degrees) with respect to the central column 1956 to provide a larger port footprint for different galley monuments.

For example, the sump 1954 may allow a drain tube attached thereto (not illustrated) to direct the flow of liquid toward a forward-facing surface of the galley monument (e.g., fore, aft, etc.) such that airline personnel may recognize the leakage. In an example, the sump 1954 can be sealed around the aircraft ports, and a recess around them connects the sump 1954 to a waste water system removing any vent valve overflow or accidental spillage. Liquids routed through the central column 1956 may include, for example, potable water, waste water, and coolant lines for refrigeration and electrical equipment.

FIGS. 10A-10E represent views of a double cavity drip tray 1200 for use with various galley monument designs described herein including connections to a water drain, according to an example embodiment. An FDA requirement for drip trays requires that there is a 1" disconnect or air gap between water entering the drip tray and water being discharged, as well as for access and cleaning. The double cavity drip tray 1200 provides a disconnect in normal use, and in addition, includes a provision for an overflow indicator that will provide visual indication of a blocked main discharge pipe via a secondary tray and outlet without contaminating a primary water supply system.

In an example, the double cavity drip tray 1200 includes an Air Conditioning Unit (ACU) drain line 1202, an inlet valve 1204, a primary tray 1206, a secondary tray 1208, a primary drain line 1210, and an overflow drain line 1212. The primary tray 1206 is disposed above the secondary tray 1208. The ACU drain line 1202 is connected at a first end to a galley return air duct (not shown) and at a second end to the primary tray 1206. A first end of the primary drain line 1210 is connected to the primary tray 1206. A first end of the overflow drain line 1212 is connected to the secondary tray 1208 and a second end of the overflow drain line 1212 is designed to be positioned on a galley floor. The ACU drain line 1202 may have an inlet valve 1204 positioned within to require a pressure head threshold to be exceeded before allowing fluid to flow toward the primary tray 1206, as well as preventing fluid in the primary tray 1206 from flowing out through the first end of the ACU drain line 1202. In one example, the inlet valve 1204 may be a silicone duckbill valve.

The primary tray 1206 and the secondary tray 1208, together with the first end of the primary drain line 1210, second end of the inlet valve 1204, and the first end of the ACU drain line 1202 form an airtight disconnect assembly 1214, the disconnect assembly 1214 is intended to meet all new ACU drain line requirements. Fluid flows from the ACU drain line 1202 into the primary tray 1206 and out the primary drain line 1210. However, in a case where a volume of fluid flowing into the primary tray 1206 is greater than a volume flowing out of the primary drain line 1210 (for example due to blockage in the primary drain line 1210), some fluid may eventually overflow onto the secondary tray 1208. Fluid may then flow out through the overflow drain line 1212, the second end of the overflow drain line 1212 positioned lower than that of the second end of the primary drain line 1210, and onto the galley floor where it may be visible to flight crew. In one example, the ACU drain line 1202 and the primary drain line 1210 are each positioned at an angle of approximately 25 to 35 degrees from the horizontal.

Electrical System

Figure 13A:
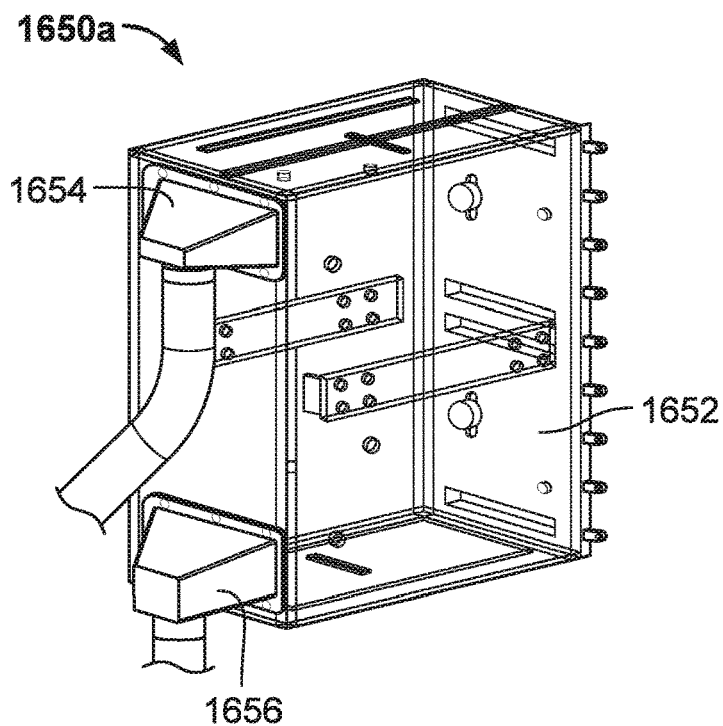
FIGS. 13A-13C represent perspective views of a chilled compartment, according to an example embodiment.
Figure 13B:
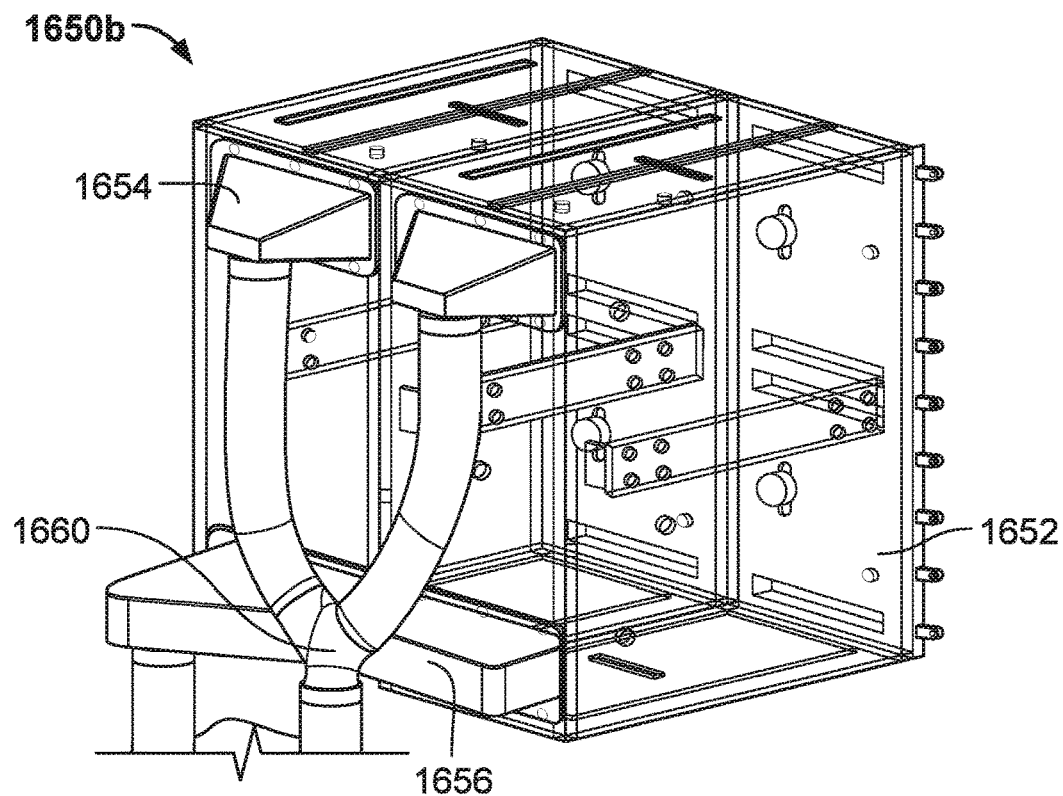
Figure 13C:
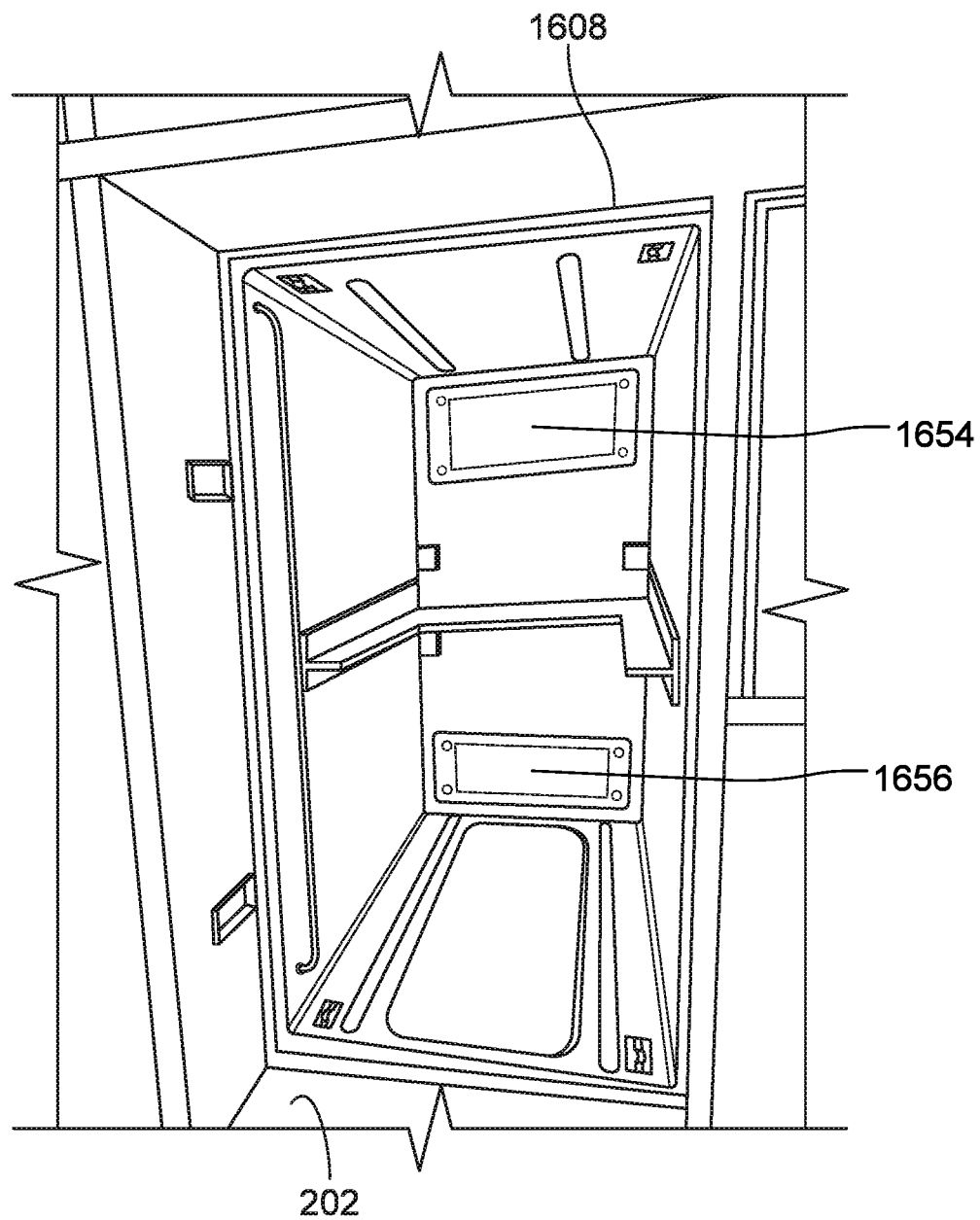

In some implementations, a modular galley monument can include a distributed electrical system in communication with a central control panel (FIGS. 11A-11B), and at least one of a heated compartment (FIGS. 12A-12B) and an air-conditioned compartment (FIGS. 13A-13C).

Figure 11A:
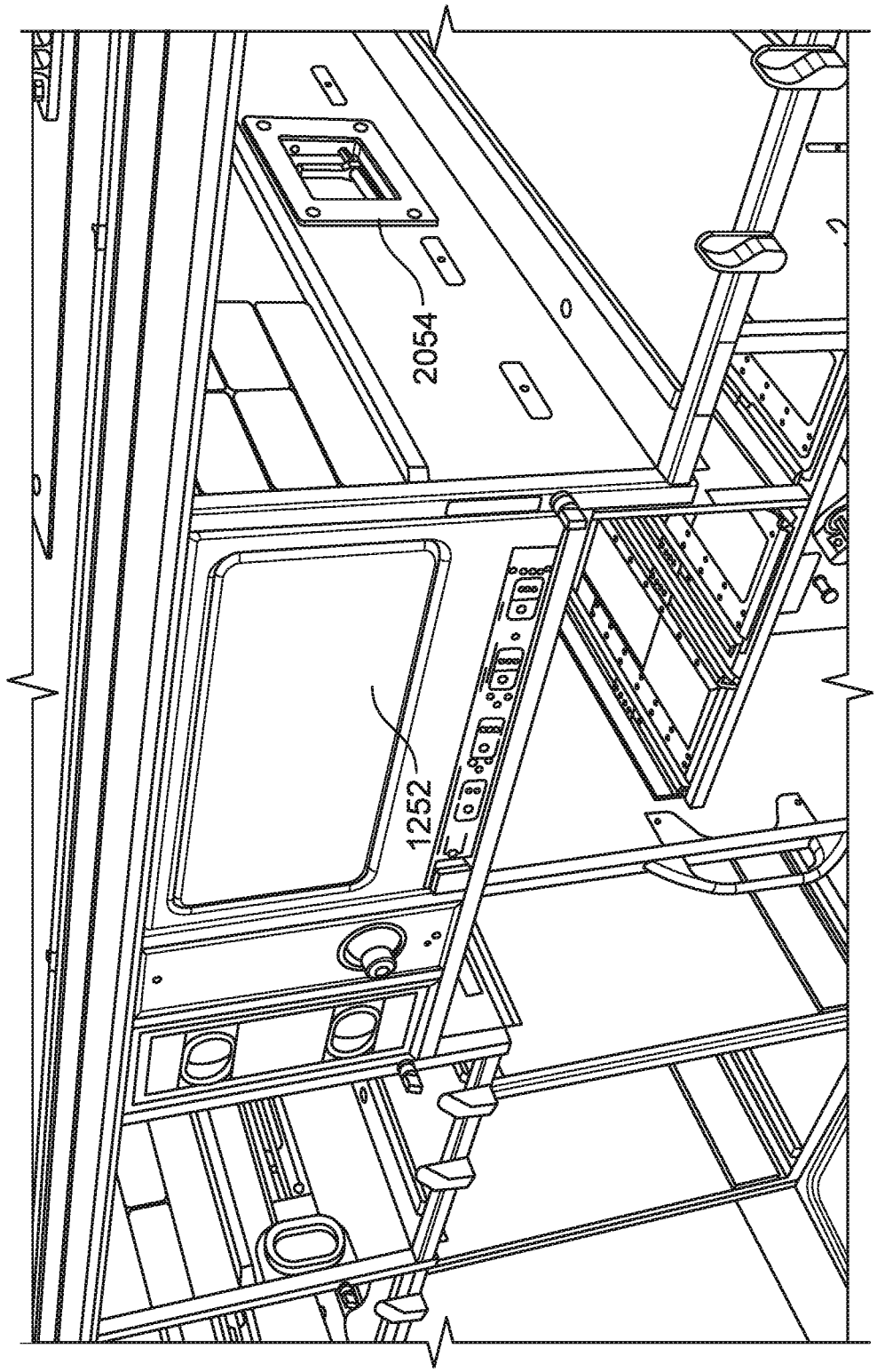
FIGS. 11A-11B represent various views of a control panel, according to an example embodiment.
Figure 11B:
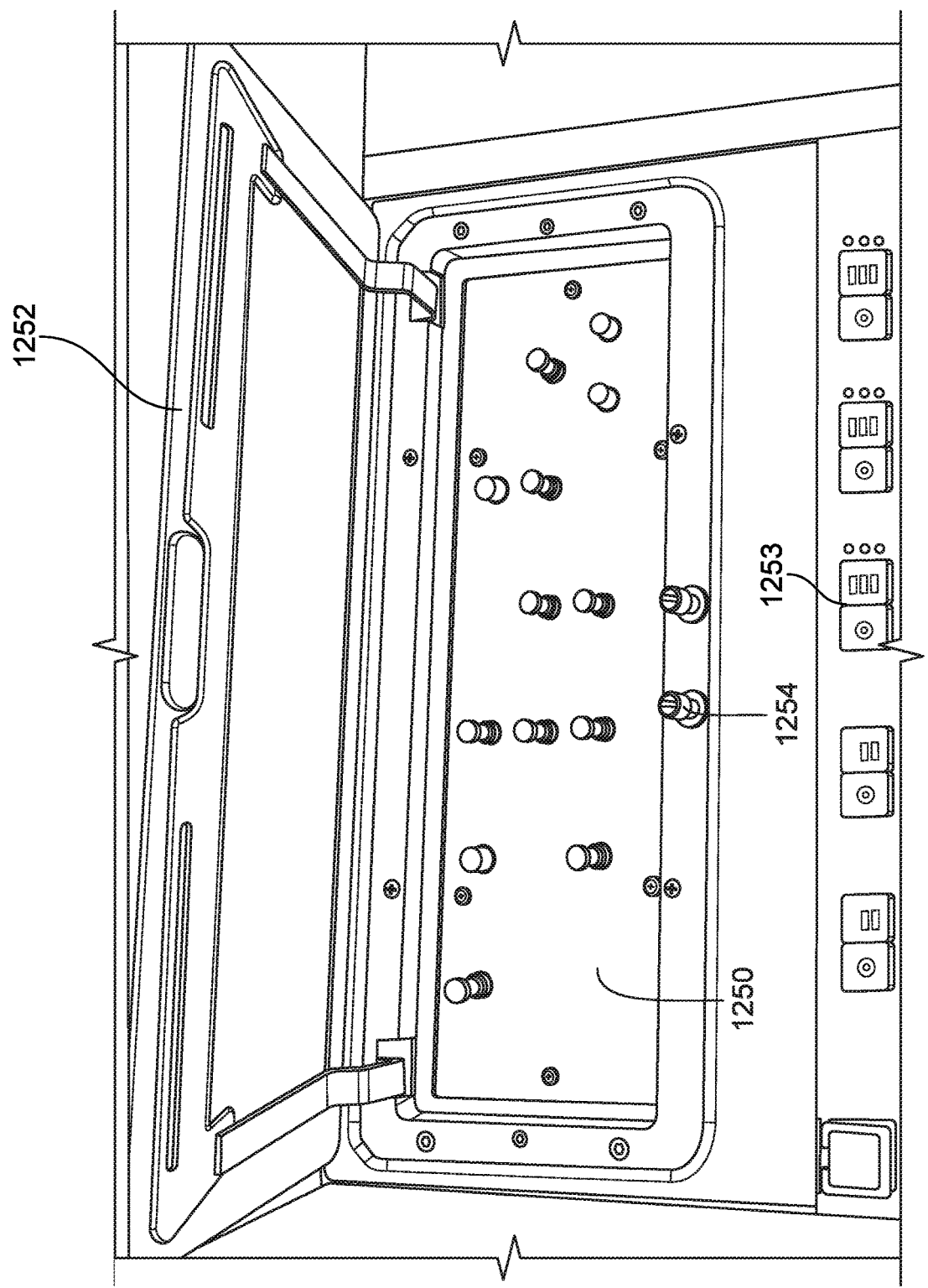

FIGS. 11A-11B represent various views of a control panel 1250, according to an example embodiment. The control panel 1250 may be used to control functions of the electrical system, the air handling system, and/or the plumbing system of a galley monument, and may include a panel cover 1252 to protect the control panel 1250 while the control panel 1250 is not in use. The panel cover 1252 may be hinged on a first side and a connector 1254 may secure a second side of the panel cover 1252 when in a closed position. There may be at least one connector 1254, and it may be of a quick release type for ease of opening of the panel cover 1252 and access to the control panel 1250. The panel cover 1252 can be provided for esthetic and cleanliness, but also needs to be easily and quickly accessible in case of emergencies. In an example, the panel cover 1252 can be made clear or semi-transparent to allow for indicator lights to be illuminated through. In an example, a chassis and fascia of the control panel 1250 can be modular and come in sizes to fit all galley monument types.

FIGS. 12A-12B represent various views of an oven 223 for mounting within a galley monument, according to an example embodiment. An insulation shell 1602 is designed to be positioned within a galley structure such as a compartment (illustrated in FIG. 2A). The compartment for the oven 223, as described above, may be located above the work surface 202 in an upper galley region. A heated compartment 1600 may be designed to be positioned within the insulation shell 1602 and may further include a door assembly 1604 and an electrical heating unit 1606. The electrical heating unit 1606 may be configured to be connected to the heated compartment 1600 and to an electrical power source aboard the aircraft to provide heat energy to the heated compartment 1600 for the purpose of heating food and/or beverages, or for keeping food warm.

In some implementations, the heated compartment 1600 can be considered part of the galley monument as opposed to being a standalone line replaceable unit. In an example, the door assembly 1604 is mounted on the galley monument and not the heated compartment 1600 itself. The door assembly 1604 may be rotatably connected about an opening of the heated compartment 1600 to allow access to inside the heated compartment 1600 while the door assembly 1604 is in a first, open position, and to seal the inside of the heated compartment 1600 to maintain control over temperature within the heated compartment 1600 while the door assembly 1604 is in a second, closed position. The heated compartment 1600 may provide the functionality of a conventional oven, and may be integrated with the galley structure 1608 to fit within a compartment 215. In an example, components of the oven 223 can be exchanged but not without removing the heated compartment 1600 from the insulation shell 1602.

FIGS. 13A-13C represent perspective views of a chilled compartment 1650, according to an example embodiment. The chilled compartment 1650 (1650*a*, 1650*b*) may be positioned where refrigerator 222 is located (see, e.g., FIG. 2B) within a compartment of a galley monument (illustrated here as galley structure 1608). For example, the chilled compartment 1650 may be located above the work surface 202. In other deployments, the chilled compartment 1650 may be positioned where a chilled trolley is stowed. The chilled compartment 1650 includes an insulated door 1652, a cold air inlet 1654, and a return air duct 1656.

The cold air inlet 1654 and the return air duct 1656 may each be connected at a first end to inside the chilled compartment 1650. The cold air inlet 1654 and the return air duct 1656 may each be connected at a second end to an Air Conditioning Unit (ACU)—not shown. The ACU provides cold air flow from the ACU 1658 to the chilled compartment 1650 through the cold air inlet 1654, and evacuates warmer return air out of the chilled compartment 1650 by drawing the return air out through the return air duct 1656. The cold air inlet 1654 may be positioned such that cold air flows into an upper portion of the chilled compartment 1650 while the return air duct 1656 may be positioned such that return air flows out from a lower portion of the chilled compartment 1650.

The insulated door 1652 may be rotatably connected about an opening of the chilled compartment 1650 to allow access to inside the chilled compartment 1650 while the insulated door 1652 is in a first, open position, and to seal the inside of the chilled compartment 1650 to maintain control over temperature within the chilled compartment 1650 while the insulated door 1652 is in a second, closed position. The chilled compartment 1650 provides the functionality of a refrigerator, and is integrated to fit within the galley structure 1608.

In an aspect, unlike a galley appliance insert refrigerator, the chilled compartment 1650 is integrated into the galley monument which provides a galley-based chilling system to supply the cold air. In an example, the galley appliance insert refrigerator includes a standalone assembly and electrically powered system for producing cold air for internal recirculation. Using the galley-based chilling system allows for different sized including smaller meal box chilled compartments which may not have space to house an individual chiller system. Further, the chilled compartment 1650 can further have shelves and the compartment door can be hinged on the galley monument.

In one example, the cold air inlet 1654 may be connected at the second end to a Y-splitter 1660 in a case where the ACU supplies cold air to more than one cold air inlet 1654, for example, such as when there is more than one chilled compartment 1650, or when a chilled compartment 1650*b* includes more than one cold air inlet 1654. The Y-splitter 1660 is then connected to the ACU.

Figure 14A:
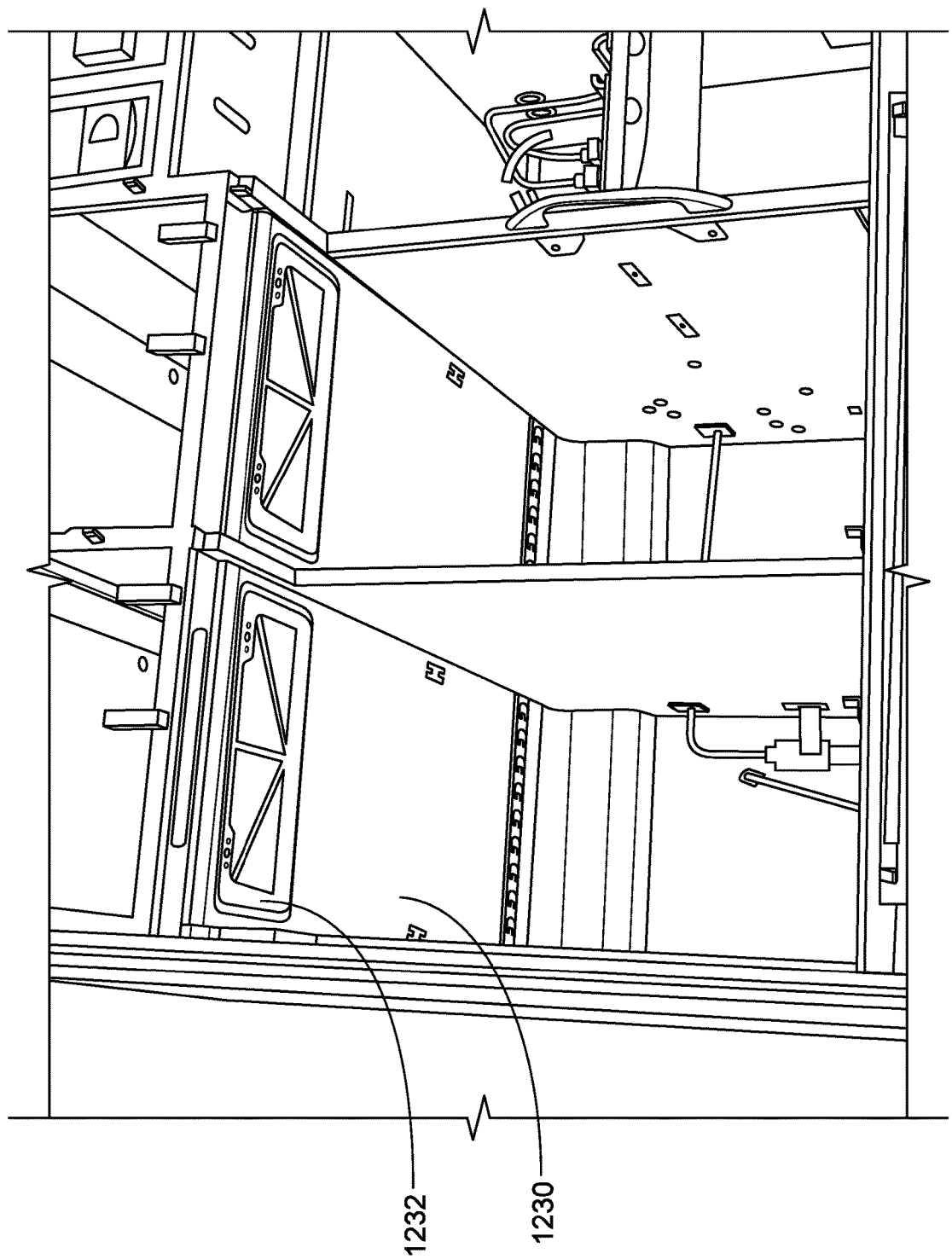
FIGS. 14A-14C represent various views of a plenum mounted above a compartment configured for a heat producing galley appliance insert within a galley monument, according to an example embodiment.
Figure 14B:
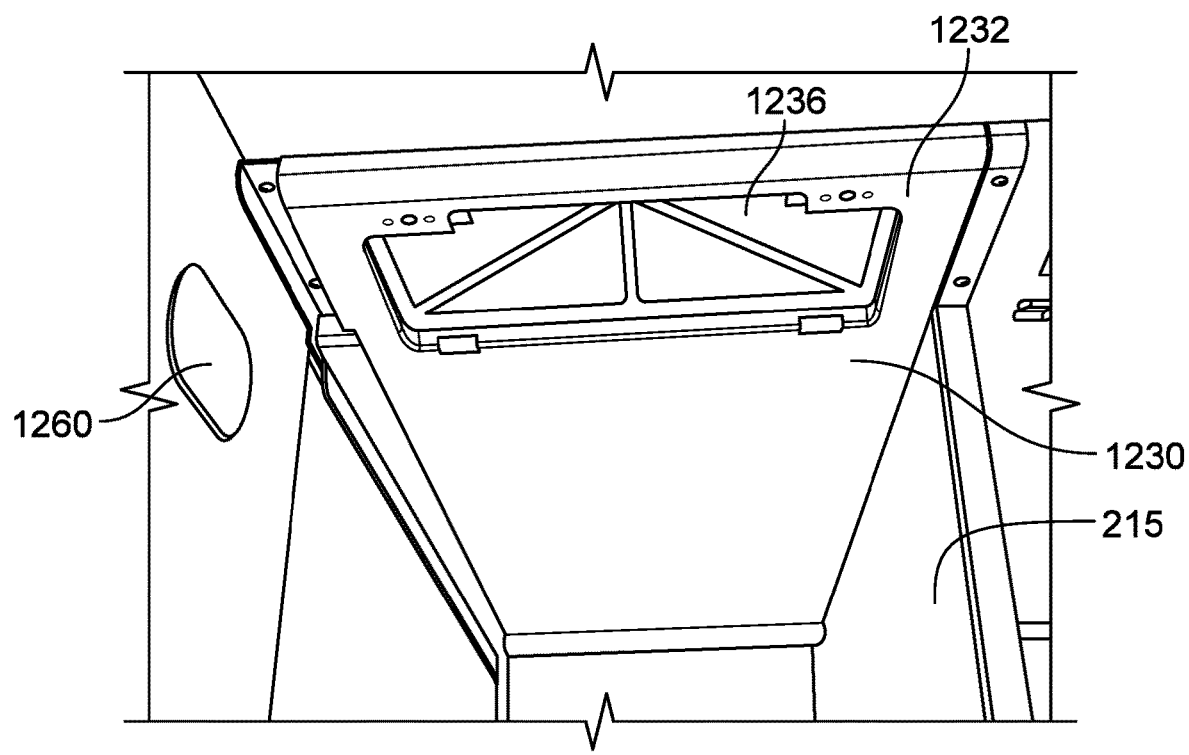
Figure 14C:
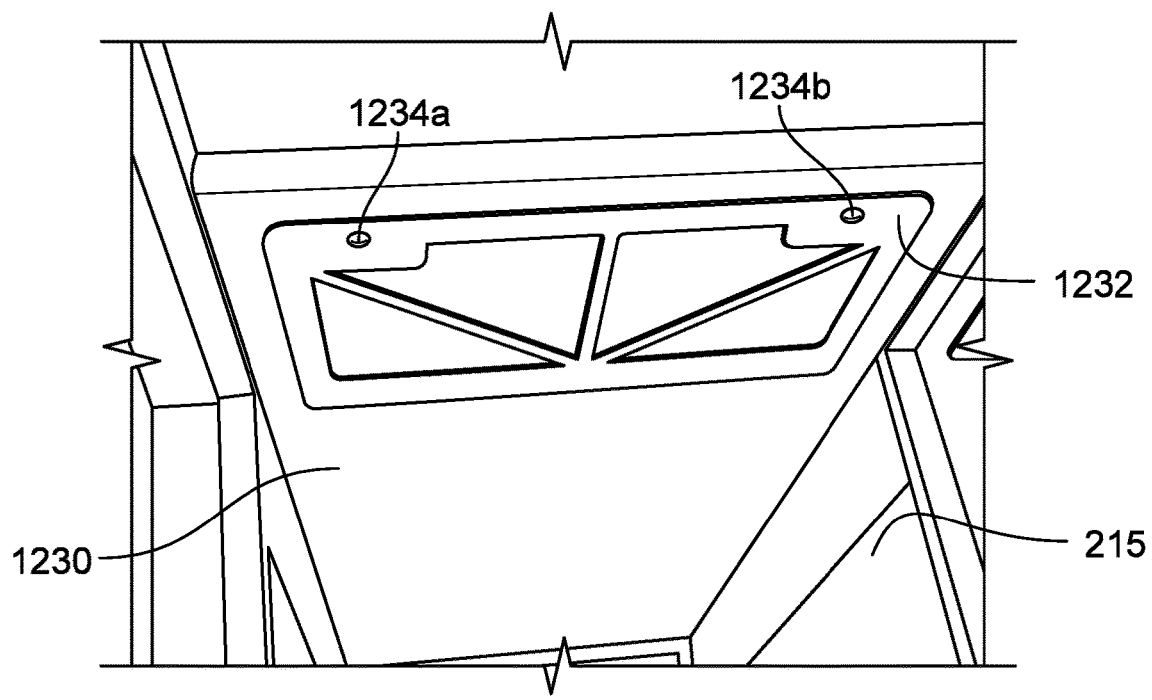

FIGS. 14A-14C represent various views of a plenum 1230 for mounting above a compartment 215 configured for a heat producing galley appliance insert within various galley monument designs described herein including connections to the air handling system, according to an example embodiment.

The plenum 1230 may include a cartridge housing 1232 connected to the plenum 1230. The cartridge housing 1232, as illustrated, holds an air filter cartridge 1236 in place. The cartridge housing 1232 may be secured by a connector 1234 on a first edge and connected by a mounting tab 1235 positioned on a second edge. The air filter cartridge 1236 filters air flow exiting the plenum 1230 directed toward an aircraft cabin, and may change color as filtration capacity is diminished to indicate a need for replacement. For example, the filter cartridge 1236 may filter air flow directed from an appliance, such as an oven or microwave, to the cabin area. In an example, the plenum 1230 is configured to vent extracted air to outside of the aircraft. The plenum 1230, for example, may extend laterally beyond and above the mounting region of the appliance (e.g., within the compartment 215) to direct air exhausted from the appliance during functionality.

The filter cartridge 1236, in some embodiments, filters odors released by the appliances (e.g., cooking food). In another example, the filter cartridge 1236 filters particulates such as smoke particles. In an example, the filter cartridge 1236 is used to remove grease from extracted airflow and prevent the grease from contaminating the aircraft galley air extraction system. Removing grease is partly for health/cleanliness reasons and partly to reduce risk of fire spreading through a contaminated air path.

The connector 1234 may be of a quick release type to allow convenient access to the air filter cartridge 1236. The connector 1234, in some embodiments, is toollessly operable, for example through actuating a latch mechanism or pressing a button. In a particular example, the connector 1234 may be operable by inserting an object such as a pen cap into a depression to actuate a button. In one example, the connector 1234 is spring loaded and may be engaged or released by turning the connector 1234, for example, by a quarter of a turn. In an example, a quick-release quarter turn of the connector 1234 operates a spring-loaded pin with a T-bar through an end that is inserted through a slot. When the connector 1234 is turned through 90 degrees, the connector 1234 locks in place against a force of the spring. In a particular example, the connector 1234 may be turned using a screw driver.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. A modular galley monument for a cabin area of an aircraft, the modular galley monument comprising:
a first monument portion comprising a first side panel, a second side panel, and
an upper panel connecting the first side panel and the second side panel, wherein
one of an upper edge and a lower edge of each of the first side panel and the second side panel define in part a periphery of the first monument portion, and the first monument portion is secured to a first aircraft attachment point;
a seal connecting the periphery of the first monument portion and a periphery of a second monument portion secured to a second aircraft attachment point, wherein the first monument portion and the second monument portion are stacked such that the second monument portion is disposed either above or below the first monument portion, and the lower monument portion of the first monument portion and the second monument portion supports at least a portion of the load of the upper monument portion of the first monument portion and the second monument portion;
wherein the seal allows for vertical deflection between the first monument portion and the second monument portion of at least one inch while maintaining contact with both the first monument portion and the second monument portion;
wherein the seal comprises a plurality of ribs along a length of the seal, each of the plurality of ribs parallel to all other of the plurality of ribs;
wherein the first monument portion is a lower monument portion and the second monument portion is an upper monument portion, wherein the second monument portion is supported independently from the first monument portion allowing the second monument portion to move relative to the first monument portion while the seal bridges a gap between the second monument portion and the first monument portion, wherein the first aircraft attachment point is a floor, wherein the second aircraft attachment point is above the floor.

2. The modular galley monument of claim 1, wherein at least a portion of the upper panel functions as a galley work surface.

3. The modular galley monument of claim 1, wherein the seal prevents direct contact between the first monument portion and the second monument portion, wherein the seal is formed of silicone.

4. The modular galley monument of claim 1, wherein the seal allows for vertical deflection of up to two inches while maintaining contact with both the first monument portion and the second monument portion.

5. The modular galley monument of claim 1, wherein a plurality of dividers partition the first monument portion into a plurality of compartments, wherein the seal maintains separation of the compartments from the second monument portion and maintains sanitation of the second monument portion.

6. The modular galley monument of claim 1, wherein:
the first monument portion comprises a set of stairs; and
the second monument portion is a crew rest area designed for crew members to rest in the crew rest area, the crew rest area including a bed, the set of stairs leading up to the crew rest area.

7. The modular galley monument of claim 6, wherein the first monument portion comprises a plurality of compartments for stowing a plurality of galley carts, wherein the seal is formed of silicone.

* * * * *